United States Patent
McFadden

(10) Patent No.: US 6,671,695 B2
(45) Date of Patent: Dec. 30, 2003

(54) DYNAMIC GROUP GENERATION AND MANAGEMENT

(75) Inventor: Terrence Paul McFadden, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 395 days.

(21) Appl. No.: 09/883,732

(22) Filed: Jun. 18, 2001

(65) Prior Publication Data

US 2003/0126137 A1 Jul. 3, 2003

(51) Int. Cl.[7] .............................................. G06F 17/30
(52) U.S. Cl. ........................ 707/102; 707/100; 707/101
(58) Field of Search ................................ 707/102, 100, 707/101, 103, 104, 9, 7, 10; 709/216, 203

(56) References Cited

U.S. PATENT DOCUMENTS 5,884,035 A * 3/1999 Butman et al. ............. 709/218
6,026,430 A * 2/2000 Butman et al. ............. 709/203
6,366,913 B1 * 4/2002 Fitler et al. ..................... 707/9

OTHER PUBLICATIONS

CriticaPath brochure, "Powerful Data Unification", Critical Path, Inc., 2000.

CriticaPath brochure, "Directory Infrastructure", Critical Path, Inc., 2000.

* cited by examiner

Primary Examiner—Sanjiv Shah
(74) Attorney, Agent, or Firm—Matthew P. Fitzpatrick; Len W. Lewis; Steven W. Miller

(57) ABSTRACT

An apparatus, program product, and method utilize "dynamic" groups to represent collections of individuals in a computer environment. With a dynamic group, a group membership criterion and a set of member identifiers are associated with one another within a dynamic group data structure, such that the set of member identifiers identifies those users from a plurality of users that meet the group membership criterion for the dynamic group. Dynamic updates are performed periodically and/or in response to predetermined events, such that the set of member identifiers for a dynamic group are updated to reflect modifications to the plurality of users, and thereby maintain the identification of members in the dynamic group current. Dynamic group data structures may be utilized in connection with multiple networked target computer environments having users that span multiple computer domains and/or enterprises, wherein the target computer environments are networked with a hub computer upon which is resident a database that maintains a dynamic group data structure. Within at least a portion of such target computer environments, mirrored group data structures are distributed and maintained, with each including at least a subset of member identifiers from the set of member identifiers associated with the dynamic group data structure.

35 Claims, 8 Drawing Sheets

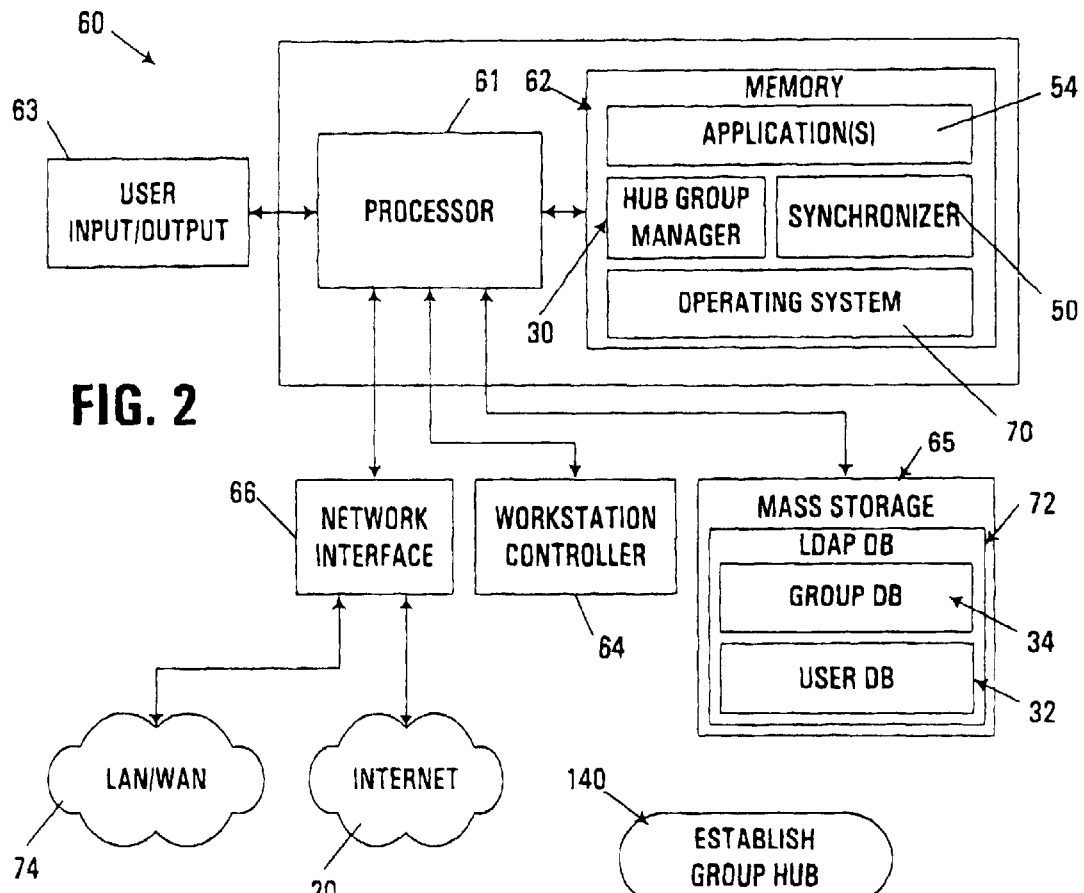
FIG. 2
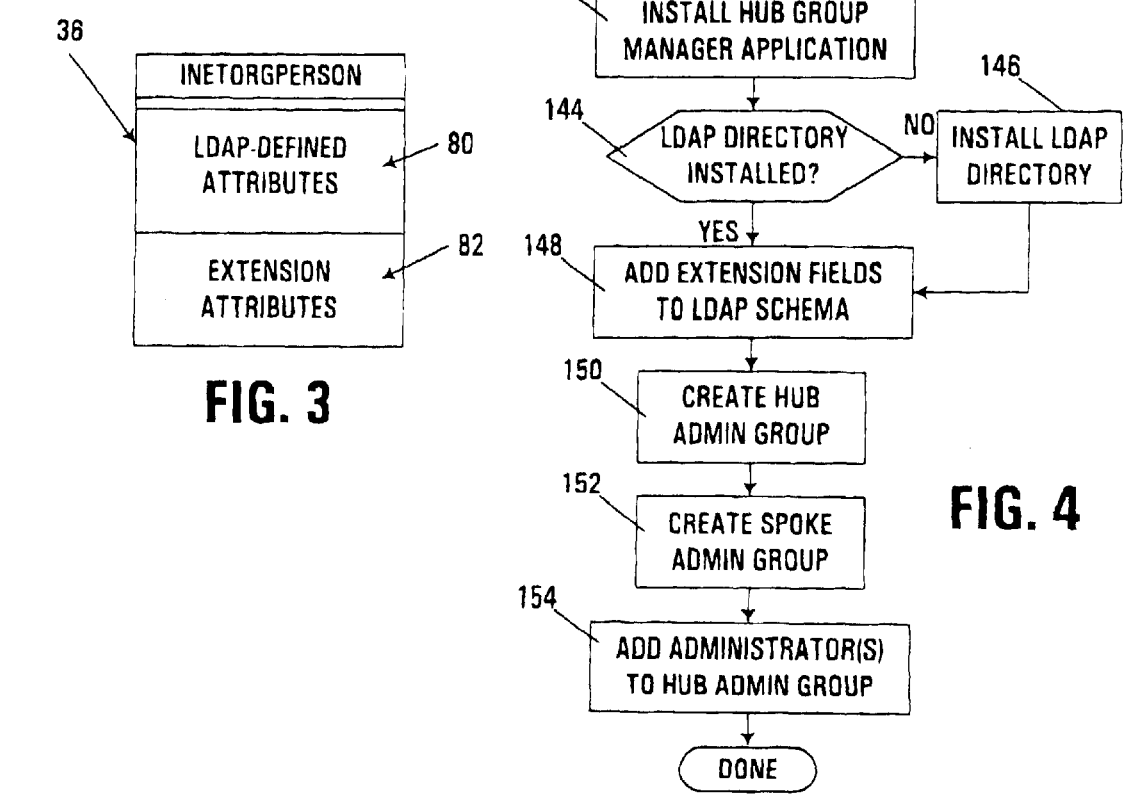
FIG. 3
FIG. 4

DYNAMIC GROUP GENERATION AND MANAGEMENT

FIELD OF THE INVENTION

The invention is generally related to the generation and management of groups of individuals within a data processing environment, e.g., for use in applications such as electronic messaging, content management, security access control and software distribution.

BACKGROUND OF THE INVENTION

As computer and networking technology has advanced, greater numbers of individuals have been linked together via interconnected computer systems to permit those individuals to perform both individual and collaborative tasks on those computer systems. In addition, the growth of public networks such as the Internet and the global telecommunications infrastructure has enabled individuals from different organizations and enterprises, as well as individuals from different parts of the globe, to effectively communicate and collaborate with one another.

When interacting with multiple individuals, a computer system typically requires some manner of identifying an individual, e.g., to determine where to send messages to that individual, to determine whether that individual is authorized to perform certain actions, etc. As a result, each individual that utilizes a computer system typically is associated with a set of data that is used by various computer systems to identify that individual. The data structures, which are often referred to as user records, typically include information such as name, network address, authorizations, and other data about an individual that may be useful in performing whatever tasks a computer system is performing on behalf of that individual. Depending upon the degree of interaction between a computer system and an individual, the user record may contain any amount of information about an individual, e.g., from only nominal information to fairly comprehensive information. For example, in an Internet email application, as little information as an email address may be tracked for certain individuals. In contrast, for an enterprise-wide groupware application, individuals may be associated with information such as name, department, facility, email address, physical address, network address, security authorizations, telephone numbers, etc.

While computers may interact with and perform tasks on behalf of individual users, in many instances, computers may be called upon to interact and/or perform tasks on behalf of multiple individuals. To support computer operations that deal with multiple individuals, a number of computer environments support the concept of a "group," i.e., a logical representation of a collection of individuals.

Groups find utility in a wide variety of computer applications. For example, in electronic messaging applications, groups may be used to facilitate message distribution to various related individuals with common interests, common positions within an enterprise, etc. For example, groups may be defined for the members of a team or project, members of a particular department or level of management, members that work in the same facility, etc.

Groups also find utility in applications such as security management, content distribution and software distribution, where certain types of individuals may share common authorities, and thus be permitted to perform certain actions (or use or view certain content or software) that are not available to the entire set of individuals that may have access a particular computer system. For example, within a computer network environment, certain individuals that maintain and manage a computer network may be granted greater authority than other individuals to permit those "administrators" of the network to change settings and otherwise configure the network to fix errors or improve its performance. Also, in some instances, certain software applications or content may be restricted to viewing only by certain individuals, e.g., the members of a project or team. By placing all of these individuals into a common group, authorities may be defined for the group as a whole, which facilitates managing the authorities granted to various individuals.

To manage a group within a computer environment, some form of data structure is typically required to permit the individuals, or "members" of that group to be readily identified. Many computer environments utilize data structures known as "records" to store the data necessary to identify the members of a group, as well as additional information that is pertinent to all members of the group, e.g., granted authorities and the like.

Conventional groups share a common characteristic insofar as such groups are enumerated, whereby the members of the group are required to be individually identified and associated with the group. As a result members are typically added and removed to and from a group on a member-by-member basis.

Whereas enumerated groups are adequate for use in many applications, in some instances, the requirement to enumerate the members of a group becomes problematic, particularly for groups with large numbers of individuals, or within organizations having large numbers of users. For example, in a typical corporate enterprise, new employees are frequently hired, and current employees may leave the enterprise or change job descriptions with relative frequency. Moreover, employees may participate in a large number of different groups that span different aspects of an employee's standing within an enterprise. For example, groups may be defined based upon projects, management positions, human resources, facilities, accounting, geography, interests, skills, etc.

Given that conventional groups require enumeration of members, whenever a new employee is hired, or an existing employee leaves or changes status, any groups that the employee is involved with (or will be involved with) typically must be updated. As a result, and particularly if employees are members of large numbers of groups, or if groups have relatively large numbers of employees that are constantly changing, it can be extremely difficult to keep all of an enterprise's groups current. The burden on administrators just in keeping groups current can be significant, and can result in substantial expenditures of time and resources within an organization, if not be entirely prohibitive for some organizations.

Moreover, given typical inefficiencies within any organization, delays in manually incorporating changes into a computer environment after an employment status change are often inevitable. Particularly where individuals are granted authorities on a computer network based upon their employee status, or where groups are used for issuing critical communications to employees, delays in updating groups to reflect changes in employment status can limit employee productivity and otherwise hamper employees' abilities to perform their jobs. As an example, if a new employee has to use a particular software application to perform his or her job, and access to that software application is reliant upon membership in a particular group, any delays in adding that employee to the group effectively hamper the employee's ability to do the job.

In other environments, enumerated groups present additional concerns. For example, substantial resources are often devoted to mailing lists and other direct marketing databases to create groups of individuals that share common interests and might be receptive to particular marketing promotions. Creation of such lists is often labor intensive, and in some instances requires the manual addition of members to a group used for the mailing list. Automated tools have been developed to assist in "crawling" the Internet for potential group members; however, any members found by a crawler are often required to be individually added to the group. Given that mailing lists may have tens or hundreds of thousands of individual members, the use of enumerated groups in such instances can be unwieldy and complex.

Yet another limitation of conventional groups is that often the data structures representing such groups are required to be centralized within a single location, and often in an internal database having restricted access outside of a particular enterprise computer network. In many instances, however, it may be desirable to define groups that span different "domains" (i.e., computer environments such as enterprise networks or subnetworks), and/or different enterprises. Moreover, when different domains utilize different underlying database technologies to implement their user and group information, distributing a logical group across these various domains and enterprises is difficult.

Therefore, a significant need exists in the art for a manner of organizing and managing groups to provide greater flexibility, adaptivity and extensibility, particularly for groups comprising large numbers of individuals and/or spanning multiple domains and/or enterprises.

SUMMARY OF THE INVENTION

The invention addresses these and other problems associated with the prior art by providing an apparatus, program product, and method that utilize "dynamic" groups to represent collections of individuals in a computer environment. With a dynamic group consistent with the invention, a group membership criterion and a set of member identifiers are associated with one another within a dynamic group data structure, such that the set of member identifiers identifies those users from a plurality of users that meet the group membership criterion for the dynamic group. Moreover, through dynamic updates that may occur periodically and/or in response to predetermined events, the set of member identifiers for a dynamic group may be updated to reflect modifications to the plurality of users so as to maintain the identification of members in the dynamic group current, often with little or no manual intervention by an administrator or other computer user. Consequently, in the case of large groups and/or groups utilized in connection with user pools that frequently change, the use of dynamic groups as described herein greatly facilitates maintaining current group memberships.

Moreover, in some embodiments dynamic group data structures may be utilized in connection with multiple networked target computer environments having users that span multiple computer domains and/or enterprises. The target computer environments are networked with a hub computer upon which is resident a database that maintains a dynamic group data structure as described above, which may include users from multiple target computer environments. Within at least a portion of such target computer environments, mirrored group data structures may be distributed and maintained, with each including at least a subset of member identifiers from the set of member identifiers associated with the dynamic group data structure. Furthermore, the target computer environments in some instances may be implemented using different underlying platforms, and/or may be under the control of different enterprises. Through automated synchronization between the hub computer and the target computer environments, however, changes made to the dynamic group data structure and/or a mirrored group data structure may be propagated throughout the networked system as necessary to maintain synchronization between all relevant group data structures in the networked system.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 2 is a block diagram of the hub computer from the networked computer system of FIG. 1.

FIG. 3 is a block diagram illustrating a user record utilized in the dynamic group management system of FIG. 1.

FIG. 4 is a flowchart that illustrates the program flow of an establish group hub routine executed by the hub group manager in the dynamic group management system of FIG. 1.

DETAILED DESCRIPTION

The embodiments described herein utilize dynamic groups to maintain group information for collections of individuals in connection with computer tasks are performed. As will become more apparent below, individuals are typically computer users, with a "user space" representing the set of users in a computer environment that are capable of being incorporated into groups. Moreover, in the context of a group, a user is considered to be a "member" of that group if that user is to be interacted with, or is to have a task performed on behalf of it, whenever a computer operation is to be performed on the group as a whole (e.g., when the operation identifies or operates on the group explicitly, rather than specific individuals).

The members of a dynamic group are defined based upon a group membership criterion, which may be based upon practically any set of characteristics, attributes, or the like that are capable of distinguishing a set of users from among a user space that meet the group membership criterion. As will become more apparent below, practically any type of rule, test, or logic may be utilized to represent a group membership criterion consistent with the invention. For example, in the illustrated implementations below, a group membership criterion may comprise one or more selected values of one or more "attributes" that identify various users within a user space. As such, when used in connection with a user record, an attribute typically is represented as a field in a user record, with the value stored in that field representing the value of the attribute.

A group membership criterion may include Boolean logic operations such as AND, OR, NOT, etc. A criterion may also be used in a negative fashion, e.g., to exclude certain users based upon certain characteristics of those users.

The set of member identifiers associated with a dynamic group may be represented by any number of data structures, including linked lists, tables, and the like. Moreover, various mechanisms for identifying users may be used as member identifiers, including, for example, user record ID's, email addresses, names, and other distinguishing user characteristics. Moreover, pointers to user records may also be used in some implementations.

Other modifications will be apparent to one of ordinary skill in the art having the benefit of the instant disclosure. Therefore, the invention is not limited to the particular implementations discussed herein.

Figure 1:
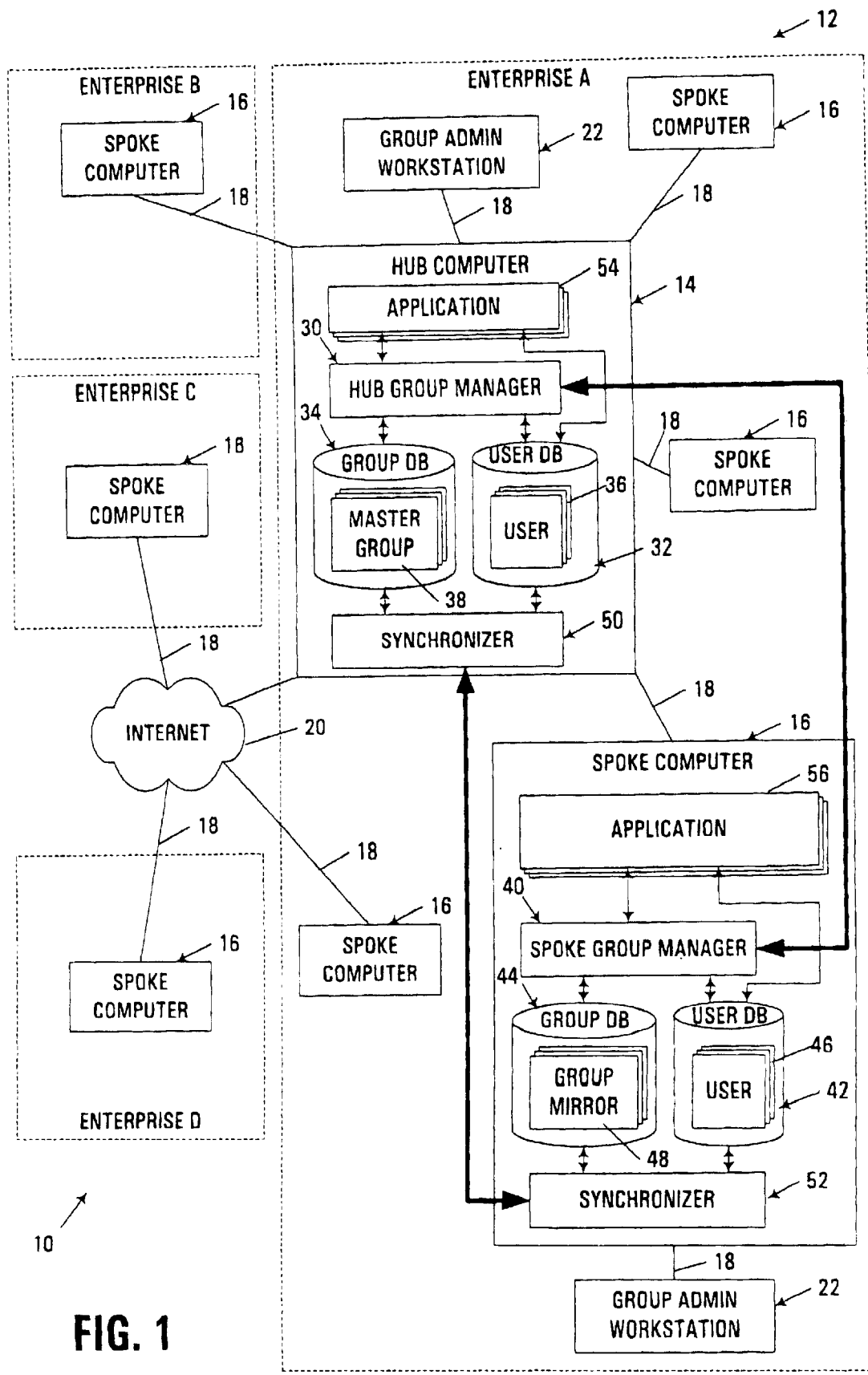
FIG. 1 is a block diagram of a multi-platform, cross-enterprise networked computer system incorporating a dynamic group management system consistent with the invention.

Turning now to the Drawings, wherein like numbers denote like parts throughout the several views, FIG. 1 illustrates a networked computer system 10 incorporating a dynamic group management system 12 consistent with the invention. Computer system 10 is illustrated as multi-platform, cross-enterprise computer system including one or more hub computers 14 coupled to one or more spoke computers 16 distributed among several enterprises (e.g., enterprises A–D). Each enterprise may represent any number of business organizations, whether non-profit or for-profit, and may represent an individual or a non-business organization as well. Each enterprise may represent a single geographical location or multiple geographical locations. Moreover, in some embodiments, dynamic group management may be limited to a single enterprise, whether in a single location or in multiple locations. Moreover, it should be appreciated that despite the fact that a dynamic group management system may be implemented within one or more specific enterprises, the individuals represented within a dynamic group need not be associated or affiliated with any particular enterprise (e.g., in the case of direct marketing groups, where individuals may be unrelated to the enterprise (s) seeking to market to them).

Hub and spoke computers 14, 16 may be interconnected via practically any known networking technology, including local-area, wide-area, public and/or private networks, and using any number and combination of known topologies and protocols. For example, network interconnects 18 are illustrated as coupling different spoke computers 16 to hub computer 14, whether be it through private means (e.g., dial-up connections) or through public means (e.g., via the Internet, represented at 20).

Moreover, any number of additional computers and other devices may be networked into networked computer system 10 as is well known in the art. For example, as will become more apparent below, administration of dynamic group management system 12 may be performed via one or more group administration workstations 22 coupled to a hub or spoke computer 14, 16. Furthermore, individuals that participate as members of a dynamic group may be accessible via client computers distributed across one or more enterprises and/or over the Internet (not shown in FIG. 1).

In the illustrated implementation, dynamic group management system 12 incorporates a hub group manager program 30 that accesses a user database 32 and a group database 34 resident on hub computer 14. Hub group manager program 30 manages the creation, modification, deletion and access to dynamic groups in a manner that will become more apparent below.

User database 32 includes a plurality of user records 36 that maintain information on individuals suitable for being incorporated into dynamic groups. User records 36 may also be used for other applications as is well known in the art. Any number of database environments and/or directory environments may be used to implement user database 32, e.g., Lotus Notes, Microsoft Exchange, Windows NT, an LDAP Directory, Novell NDS, other directory and/or address book databases, proprietary databases, etc.

Group database 34 includes a plurality of master group records 38 that maintain information about the various dynamic groups managed by dynamic group management system 12. Any of the aforementioned database environments suitable for use with user database 32 may be used for group database 34. Moreover, in some implementations master group records 38 and user records 36 may be managed in the same database.

In the implementation discussed hereinafter, for example, user and group records are maintained in a hub computer within a combined database that supports the Lightweight Directory Access Protocol (LDAP) directory protocol, e.g., IDS (formerly GDS) available from Critical Path.

Each spoke computer typically includes a spoke group manager 40 that is interfaced with a local user database 42 and group database 44, within which is respectively maintained user records 46 and group mirror records 48. While the principal dynamic group management components are illustrated in only one of spoke computers 16 in FIG. 1, it will be appreciated that generally all such computers 16 incorporate the same or similar components. Of course, in some implementations, the various spoke computers distributed within a system need not be identical in software or hardware design.

With respect to databases 42, 44, some or all of the user records 46 may be duplicates or mirrors of user records 36 stored in the hub computer. In the alternative, the user records 46 may be completely different, and correspond, for example, to only those users that are managed by the particular spoke computer or domain or enterprise within which such spoke computer resides.

The group mirror records 48 in each spoke computer are mirrored (i.e., at least partially replicated) copies of the master group records 38. In particular, the group-related data in a master group record that is relevant to a particular dynamic group is typically replicated to all group mirror records. On the other hand, if the user records that match the group membership criterion are stored within the group records, the group mirror records 48 may include only the identifications of the user records that are managed by that spoke computer. In other embodiments, however, the group mirror records may store the identifications of all user records that are members of a dynamic group, regardless of domain or enterprise. Groups may be local, i.e., unique to a single platform and not referenceable within another group, or they may be global, in which case they are universally available in the group management complex supported, and may be included within other groups.

As with hub databases 32, 34, each of spoke databases 42, 44 may be implemented using any number of database environments, e.g., LDAP-compatible directory environments. Moreover, user and group mirror records 46, 48 may be maintained within the same database in a particular spoke computer. Furthermore, as will become more apparent below, the native environment for each database 42, 44 can vary between any given hub and spoke computers. Thus, for example, even if the hub computer or one or more spoke computers utilizes a Lotus Notes database, a spoke computer in another domain in the same enterprise, or even within another enterprise, may utilize another database environment, e.g., a Microsoft Windows NT LDAP Directory. As such, while dynamic group management system 12 may be limited to use in a single computer, within a single domain, utilizing a single database environment and controlled by a single enterprise, in other embodiments, such a system may be distributed among multiple hub and/or spoke computers and/or may be multi-platform, multi-enterprise, and/or multi-domain in nature.

To maintain synchronization between the various databases within dynamic group management system 12, a synchronizer program (e.g., synchronizer programs 50, 52 on hub and spoke computers 14, 16) is used. The synchronizer program(s) perform a number of useful functions, including maintaining synchronization between the respective user and group records on hub and spoke computers, as well as updating group memberships to reflect changes made to the user records in the user databases. The synchronizer program(s) may be configured to perform various tasks on a periodic basis, or may be configured to perform certain tasks in response to certain events. For example, an update to a dynamic group may be triggered by an addition or deletion of a user record in a user database.

A number of commercially available database synchronization tools may be used to implement the synchronizer program(s) 50. For example, the InJoin Meta-Directory product from Critical Path of San Francisco, Calif. (among others) may be used to perform the necessary synchronization between the databases utilized by dynamic group management system 12. In the alternative, a proprietary solution may be used. In either event, configuration of a synchronizer program to perform the necessary synchronization functions described herein would be within the abilities of one of ordinary skill in the art having the benefit of the instant disclosure.

Utilization of dynamic group management system 12 is typically via one or more application programs (e.g., application programs 54, 56 shown resident on hub and spoke computers 14, 16) having access to services provided by the group manager programs 30, 40. Given the wide variety of end use applications of dynamic groups consistent with the invention, a wide variety of application programs may access group manager programs 30, 40, e.g., electronic messaging application programs, security management application programs, software distribution application programs, content management application programs, etc. Moreover, various operating system components may access the aforementioned services consistent with the invention. An application program may access a dynamic group via a group manager service either on the same or a different computer from that which the application program resides.

FIG. 2 illustrates in another way an exemplary hardware and software environment for an apparatus 60 consistent with the invention. For the purposes of the invention, apparatus 60 may represent practically any type of computer, computer system or other programmable electronic device, including a client or desktop computer, a workstation, a server computer, a portable computer, a handheld computer, an embedded controller, etc. Apparatus 60 will hereinafter also be referred to as a "computer", although it should be appreciated the term "apparatus" may also include other suitable programmable electronic devices consistent with the invention.

Computer 60 typically includes at least one processor 61 coupled to a memory 62. Processor 61 may represent one or more processors (e.g., microprocessors), and memory 62 may represent the random access memory (RAM) devices comprising the main storage of computer 60, as well as any supplemental levels of memory, e.g., cache memories, non-volatile or backup memories (e.g., programmable or flash memories), read-only memories, etc. In addition, memory 62 may be considered to include memory storage physically located elsewhere in computer 60, e.g., any cache memory in a processor 61, as well as any storage capacity used as a virtual memory, e.g., as stored on a mass storage device 65 or on another computer coupled to computer 60 via network interface 66.

Computer 60 also typically receives a number of inputs and outputs for communicating information externally. For interface with a user or operator, computer 60 may include one or more user input/output devices 63 (e.g., a keyboard, a mouse, a trackball, a joystick, a touchpad, a display device such as a CRT monitor or LCD display panel, a speaker, etc. Otherwise, user input may be received via another computer interfaced with computer 60 through a workstation controller 64, or over a network via network interface 66.

For additional storage, computer 60 may also include one or more mass storage devices 65, e.g., a floppy or other removable disk drive, a hard disk drive, a direct access storage device (DASD), an optical drive (e.g., a CD drive, a DVD drive, etc.), and/or a tape drive, among others. Furthermore, computer 60 may include an interface 66 with one or more networks (e.g., a LAN and/or WAN 74, and/or the Internet 20, among others) to permit the communication of information with other computers. It should be appreciated that computer 60 typically includes suitable analog and/or digital interfaces between processor 61 and each of components 62, 63, 64, 65 and 66 as is well known in the art.

Computer 60 operates under the control of an operating system 70, and executes or otherwise relies upon various computer software applications, components, programs, objects, modules, data structures, etc. For example, FIG. 2 illustrates an application of computer 60 as a hub computer as described above (similar components would be resident in a spoke computer as described above in connection with FIG. 1), including for example, hub group manager program 30, synchronizer program 50 and application program 54 resident in memory 61, and user and group databases 32, 34 shown resident in mass storage 65 (and further shown implemented within a combined LDAP-compatible database 72). Moreover, various applications, components, programs, objects, modules, etc. may also execute on one or more processors in another computer coupled to computer 60 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Now turning to FIG. 3, an exemplary user record 36 is illustrated in greater detail. User record 36 may be implemented, for example, using an extended LDAP record object such as an extended object based upon the LDAP InetOrgPerson object class, which is well known in the art. The extended record object 36 therefore includes a plurality of LDAP-defined attributes 80, with the addition of one or more extension attributes 82 representing additional attributes suitable for use in networked computer system 10, in particular to support dynamic groups consistent with the invention. To support dynamic groups, a conventional LDAP InetOrgPerson object may be extended with one or more attributes for which it is desirable to distinguish users and thus permit the selection of members from the user space. Typically, it is also desirable to include an additional field that identifies what groups a particular user is a member of, particularly for performance reasons. Otherwise, if the attributes defined by the LDAP protocol are sufficient for selecting among users in a particular application, no extension of the LDAP InetOrgPerson class may be required.

Figures 5, 6:
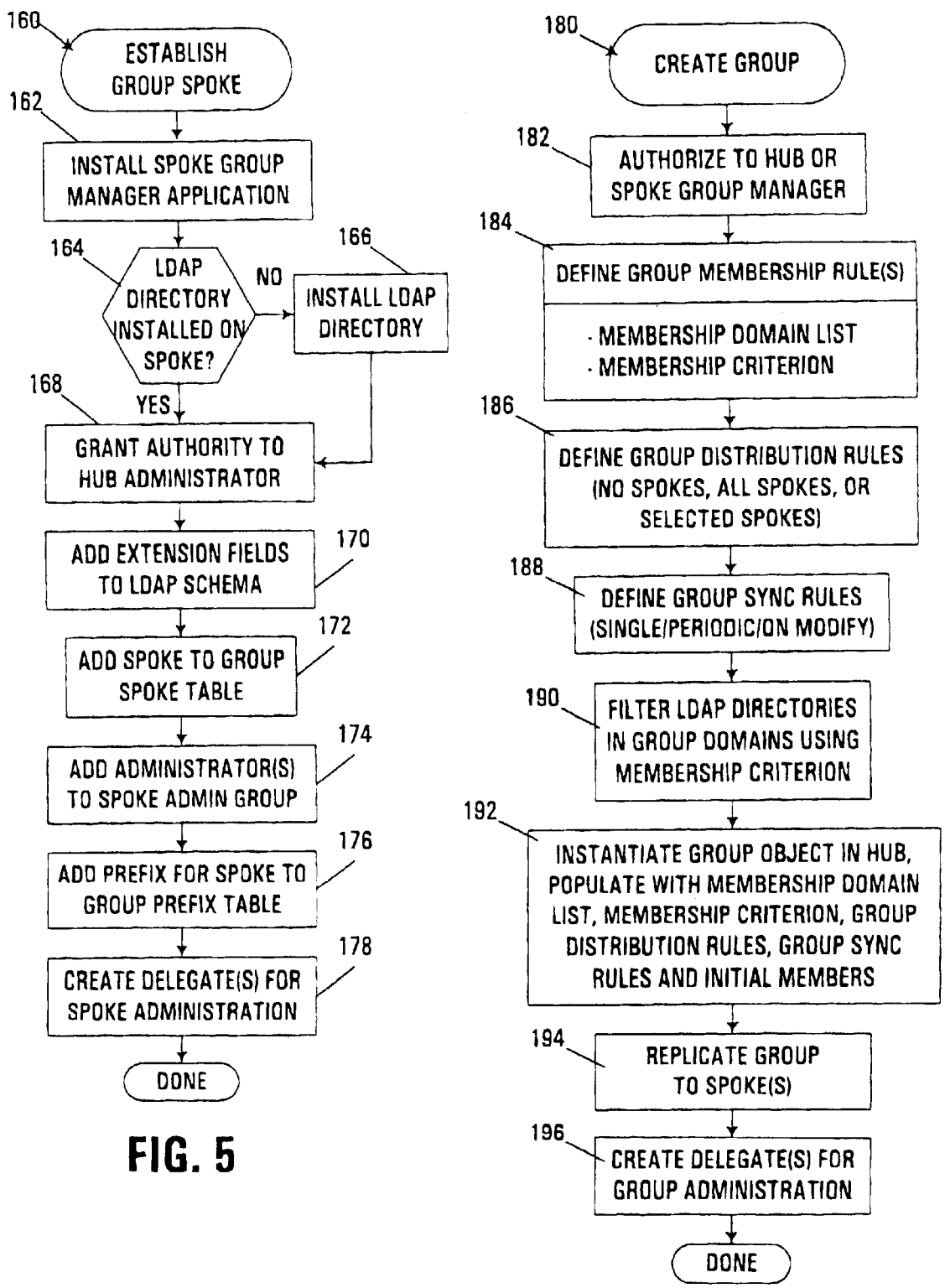
FIG. 5 is a flowchart that illustrates the program flow of an establish group spoke routine executed by the hub group manager in the dynamic group management system of FIG. 1.
FIG. 6 is a flowchart that illustrates the program flow of a create group routine executed by the hub group manager in the dynamic group management system of FIG. 1.

FIGS. 4–6 next illustrate a number of routines executed by a dynamic group management system to install dynamic group functionality in a distributed, multi-enterprise computer environment, which will also be referred to hereinafter as an Extended Enterprise Community (EEC). In this exemplary implementation, it is anticipated that an extended community of users spanning multiple enterprises are capable of being linked together into groups that span the digital boundaries of different domains and enterprises.

To implement dynamic groups within such an environment, it is desirable to first establish a group hub, representing the master site from which groups are defined. FIG. 4, for example, illustrates an establish group hub routine 140 which is executed to initialize dynamic groups on a hub computer.

Routine 140 begins in block 142 by installing a hub group manager application on the hub computer. Next, block 144 determines whether an LDAP directory is installed. If not, control passes to block 146 to install the LDAP directory. Control then passes to block 148 to add the aforementioned extension fields to the LDAP schema. Alternatively, if block 144 determines that the LDAP directory is already installed, block 146 is bypassed, and control passes directly to block 148.

Next, block 150 creates a group in the Group of Names object class defined by the LDAP standard to hold the name of hub administrators of the application at the hub computer. Next, block 152 creates a spoke administrator group to be used to hold the names of the spoke administrators for the system. The hub and spoke administrator groups may be enumerated groups under the LDAP standard.

Next, block 154 adds one or more administrators to the hub administrator group, with such administrators granted the authority to create groups, add other group administrators and add spokes and spoke administrators. The administrators defined in block 154 are referred to as group hub administrators. Upon completion of block 154 routine 140 is complete.

FIG. 5 next illustrates the process for establishing a group spoke in another computer domain or enterprise. In particular, FIG. 5 illustrates an establish group spoke routine 160 that begins in block 162 by installing a spoke group manager application on a spoke computer within the target computer environment within which a group spoke is desired. Next, block 164 determines whether an LDAP directory is currently installed on the spoke. If not, control passes to block 166 to install the LDAP directory. Otherwise, if the LDAP directory is already installed on the spoke, block 166 is bypassed.

Next, block 168 grants authority to the group hub administrator for interacting with the group spoke infrastructure. In particular, the group administrator is granted read authority on the InetOrgPerson object class, and granted create/read/update/delete authority on the Group of Names object class.

Next, in block 170, the aforementioned extension fields are added to the LDAP schema on the group spoke. Next, in block 172, the newly-created group spoke is added to the group spoke table in the group or application. In this context, the group spokes may be considered to be domains that hold users and attributes about the users, and that are the basis for providing user data that may be used in group inclusion rules. Additionally, as described above, each group spoke may have groups "pushed" to it by the group hub.

Next, in block 174, one or more administrators are added to the spoke administration group. In the illustrated implementation, all group spoke administrators have full group management privileges for all group spoke computers registered to them.

Next, in block 176, a prefix for each spoke computer is created and added to a master prefix table. It is intended that all groups created by the spoke administrator will have this prefix as a standard part of its group name.

Next, in block 178, the spoke administrator is permitted to create one or more delegates for performing spoke administration. Routine 160 is then complete, resulting in the establishment of a group spoke on one of the spoke computers in the networked computer system. It will be appreciated that routine 160 may be executed for each domain or enterprise for which it is desired to add a group spoke.

FIG. 6 next illustrates a create group routine 180 initiated by any user with group administrator privileges, whether a hub group administrator or a spoke group administrator. Typically, routine 180 is initiated through interaction by such authorized user with the appropriate hub or spoke group manager application running on the computer through which the user is interacting with the dynamic group management system.

Routine 180 begins in block 182 by authorizing the user as a hub or spoke group administrator. It will be appreciated that if the user initiating routine 180 does not have sufficient authorization, routine 180 may be terminated prematurely. It should also be appreciated that block 182 may incorporate additional security features such as requiring the input of a password by the user to verify his or her administrator status.

Next, in block 184, the administrator specifies the group membership rules for a new group. In the illustrated implementation, this may be performed in attribute-type/attribute-value pairs, e.g., through the selection of appropriate values from among a fixed set of available values for each attribute. As such the establishment of rules may be made through a graphical user interface incorporating controls such as radio buttons, list boxes, check boxes and the like.

Among the membership rules defined in block 184 are a membership domain list and a membership criterion. The membership domain list includes the domains from which users can be selected. Typically, if no domain is specified, all users in the extended enterprise community will be available for inclusion, with the specified membership criterion applied to all domains.

The membership criterion reflects the attribute types and values that are the basis for group inclusion by users. Any of the attributes, or a combination thereof, may be utilized in a group membership criterion consistent with the invention. Moreover, at this time logic rules, e.g., Boolean connectors, may be specified.

Next, block 186 defines the group distribution rules, which specifies where the group is to be distributed. The options may include leaving the group exclusively in the hub. It should be appreciated, that even with the group maintained within the hub, spoke computers, as well as other user computers distributed throughout a networked computer system, may still access the hub computer to utilize the created group.

In the alternative, an administrator may specify that a group is distributed to all spokes in the EEC. Moreover, in some embodiments it may be desirable to permit an administrator to select to which specific spokes the group should be distributed.

Next, block 188 defines group synchronization rules, which specifies when a group is to be distributed and updated. In the illustrated implementation, both periodic and event-based synchronization may be supported. Thus, for example, an event-based synchronization may be selected to permit near real-time synchronization of hub and spoke group records in response to changes made throughout the system. For example, synchronization may be triggered upon modifications to one or more user records in a hub and/or spoke user database. Synchronization may also be triggered based upon changes to a group data structure in either or both of a hub or spoke group record (e.g., changing the domain list, the synchronization and/or distribution rules, and/or the membership criterion). Other events, for example a predetermined synchronization schedule, or real-time "synch now" command, may be used to trigger synchronization and dynamic update of a dynamic group consistent with the invention.

Another alternative for group distribution is that of periodic distribution, whereby group records present on the hub and spoke computers are synchronized at predetermined intervals. Moreover, it should be appreciated that different periodic intervals may be specified for dynamically updating group membership and synchronizing hub and spoke group records.

Another option for distributing groups is a one-time distribution, whereby spoke computers are initially pushed the initial group record for a dynamic group, with no further synchronization performed until manually specified by an administrator. Such a configuration may be desirable when dynamic group functionality is used solely to facilitate the initial creation of a large group.

Once the group synchronization rules are defined in block 188, block 190 filters the LDAP directories in each of the group domains (hubs and spokes) using the membership criterion defined for the group, e.g., using a known filtering process to return identifiers or keys to the matching directory entries. As such, the person objects in the hub and selected spokes are scanned and filtered based upon the membership criterion.

Next, block 192 instantiates the group object in the hub, and populates the hub with the membership domain list, the membership criterion, the group distribution rules, the group synchronization rules, and a list of identifiers for the users that initially satisfy the membership criterion within the specified membership domains.

Next, block 194 replicates the group record to the designated spoke environments based upon the distribution and synchronization criteria. Once the group has been replicated, block 196 then creates any delegates for group administration as specified by the administrator that has created the group, and routine 180 is then complete. It should be appreciated that the designation of delegates for either group, hub or spoke administration may be optional in some environments.

In some implementations, it may be desirable to add exceptions to groups, such that not all members are completely consistent with the group membership criterion. In such instances, it may be desirable to create an exception group that is hand-populated through enumeration, and used to add or remove selected members to and from the dynamically-generated list of members for the group. In other environments, however, such functionality may be omitted.

Once a group is created, synchronization is performed at the intervals described above. Such synchronization may be performed via proprietary routines. In the alternative, the aforementioned synchronizer application may be utilized to perform such synchronization. As a component of synchronization, dynamic updates of the group and/or spoke group memberships may be performed simply by performing the aforementioned LDAP filtering and selection operation based upon the current settings for a particular group (e.g., as described above in connection with block 190 of FIG. 6).

Furthermore, it will be appreciated that the creation of group spokes in various domains may rely on differing underlying platforms. However, given the support of the LDAP directory standard across all platforms, any differences in the underlying platforms may be minimized from the standpoint of the dynamic group management system. In some applications, however, additional customization may be required to suitably implement the dynamic group management system within various types of platforms.

Once groups are established, utilization of the groups typically comprises the access of such groups via one or more applications executing in a hub computer and/or with a target computer environment (e.g., one of applications 54, 56 shown in FIG. 1). As is well known in the art, each group manager (e.g., group managers 34, 40 of FIG. 1), may expose one or more services, e.g., via API routines, remote procedure calls, remote object invocations, dynamic link libraries, XML services via HTTP, etc. through which a user interacting with a dynamic group management system via any of hub and spoke computers may interact with the group. In fact, from the standpoint of a user or end-use application, services that are similar or identical to those provided by enumerated groups may be provided by a dynamic group management system such that the dynamic functionality implemented within the herein-described dynamic groups is effectively hidden from end users. Put another way, the dynamic groups may be used and interacted with in the same manner as enumerated groups. As such, retrieval of group members, and other group-related functions known in the art may be performed by a user interacting with a dynamic group consistent with the invention.

While the dynamic groups described herein have a wide variety of applications, a number of specific exemplary applications are described hereinafter, starting with a security management application in which authorization to computer resources is controlled based upon a user's membership in a dynamic group. Other applications, including software distribution, content management, and electronic messaging, are also described hereinafter.

Security Management Application Implementation

Figure 7:
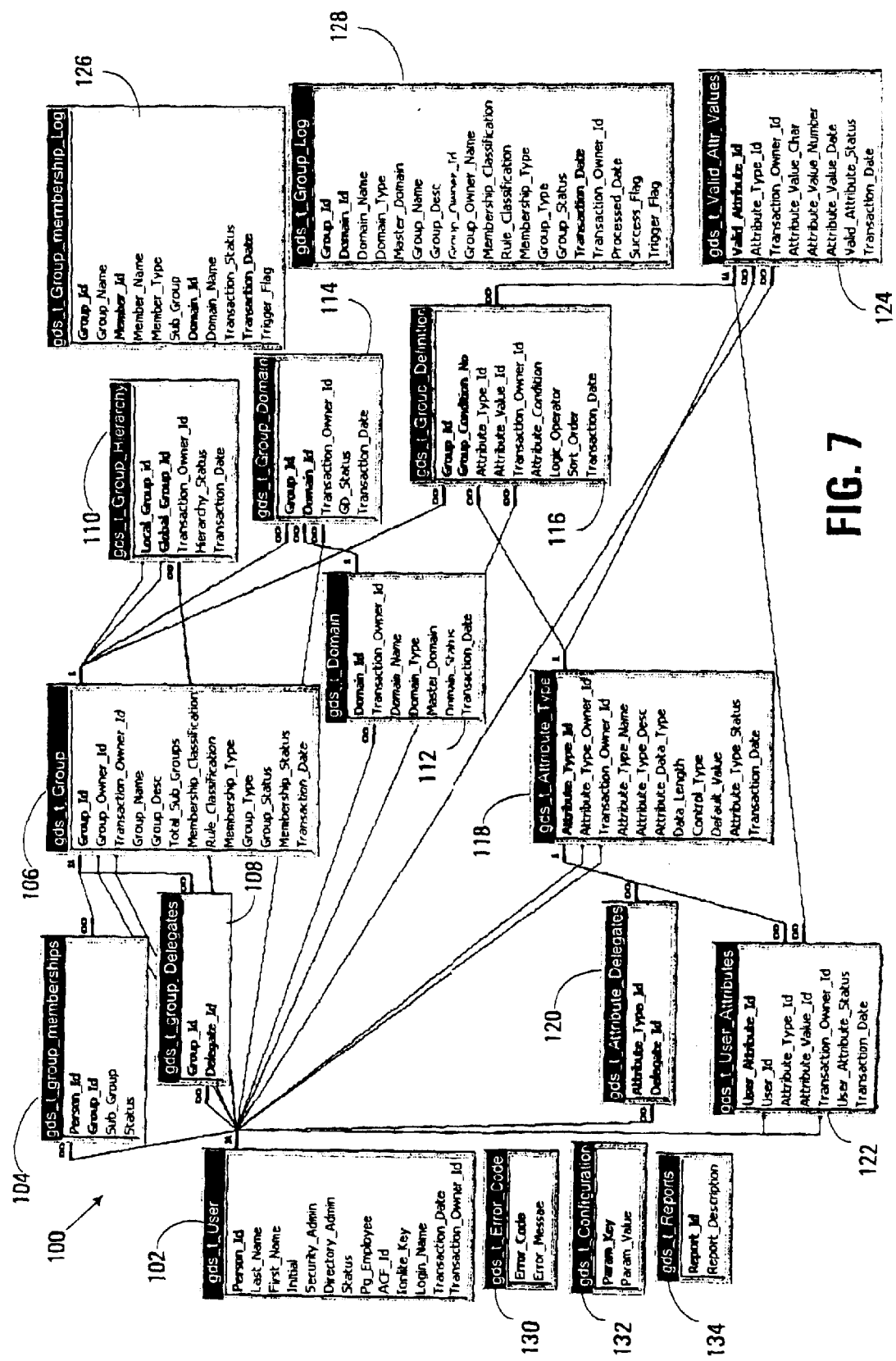
FIG. 7 is an object diagram illustrating an exemplary database schema utilized in connection with managing dynamic groups in an exemplary security management application of the dynamic group management system of FIG. 1.
Figure 8:
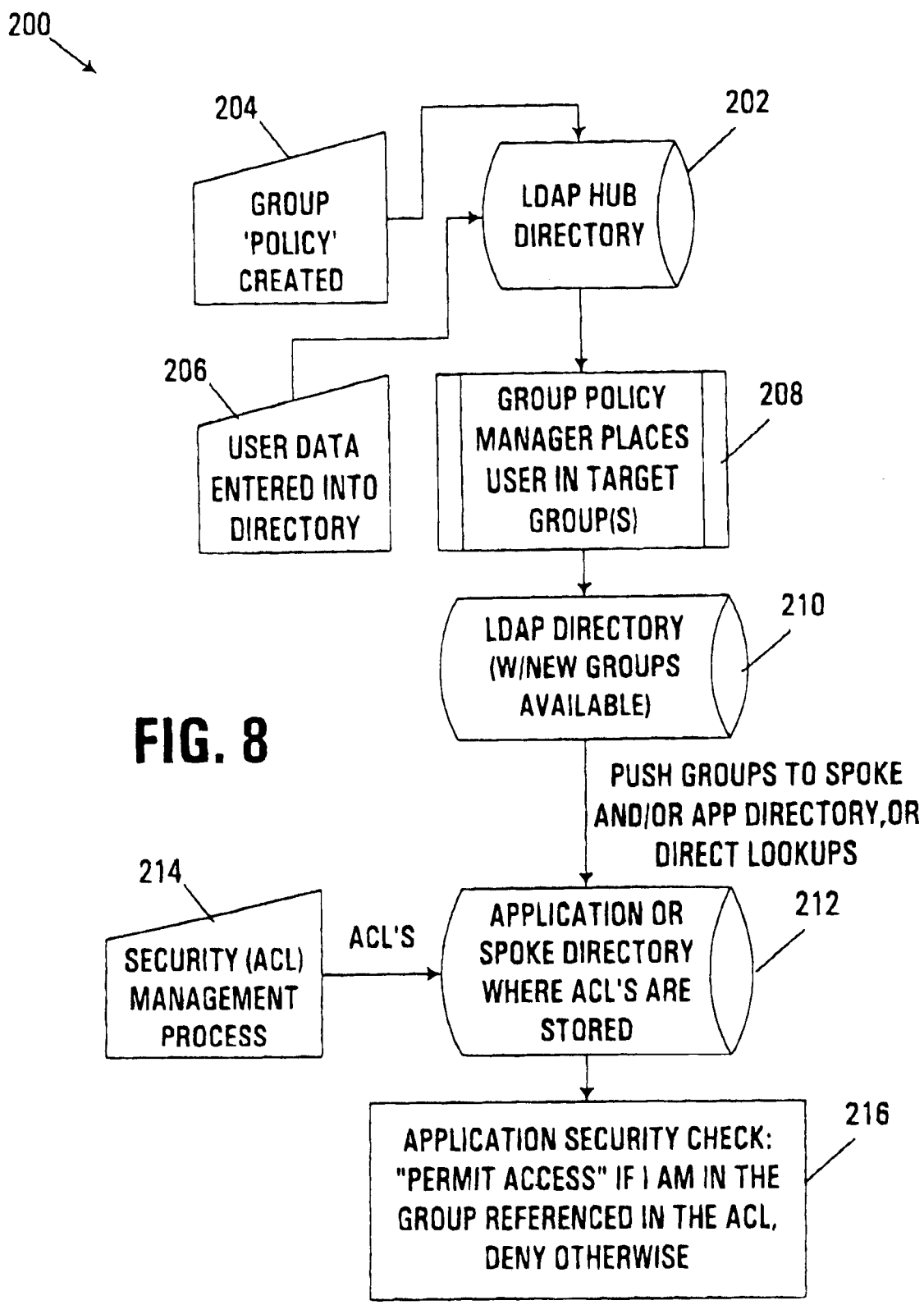
FIG. 8 is a block diagram of the utilization of the exemplary security management application having the database schema of FIG. 7.

FIGS. 7–8 illustrate one exemplary application of dynamic groups in implementing security management functionality throughout a multi-enterprise/multi-domain computer environment. In this exemplary implementation, the LDAP InetOrgPerson object class is extended to incorporate the attributes listed below in Table I. The extended attributes are distinguished from conventional LDAP attributes by virtue of an "Ext" prefix on the attribute identifier.

TABLE I

EXTENDED LDAP OBJECT ATTRIBUTES

| LDAP ATTRIBUTE | DEFINITION OF ATTRIBUTE |
| --- | --- |
| commonName or cn | User/employee full name |
| ExtPrefix | User/employee naming prefix (Mrs, Ms, Mr, Dr etc.) |
| givenName | User/employee first name |
| initials | User/employee initials |
| ExtMiddleName | User/employee middle name |
| ExtInitials | Extended initials (if duplicated initials exist) |
| surName or sn | User/employee last name |
| uid | Unique ID |
| EmployeeType | Description of user/employee's status |
| ExtStatus | Extension to status (0 = Active, 2 = Inactive) |
| ExtCompany | Company name of contractors |
| ExtHireDate | Date user/employee most recently began work @ company |
| ExtNotesMail | Internal email address used by user/employee to send internal messages |
| mail | Internet-standard format email address used by user/employee. |
| telephoneNumber | User/employee telephone number |
| ExtExtension | Extension of User/employee work phone number |
| ExtAltPhone | Alternate phone number |
| ExtStarnet | Internal company phone number |
| fascimileTelephoneNumber | Fax number |
| ExtFaxServer | Fax server |
| ExtStarnetFax | Internal company fax number |
| ExtTelephony | Telephony Information |
| mobile | Mobile phone number |
| pager | Pager phone number |
| secretary | Name of the user/employee's administrative assistant |
| seeAlso | Name of the user/employee's alternate or backup |
| manager | Name of the user/employee's manager |
| ExtPhotoURL | A ".gif" or ".jpeg" file containing user/employee's picture |
| ExtOrgType | User/employee's business unit type |
| ExtOrgName | User/employee's business unit name |
| departmentNumber | User/employee department number |
| ExtDepartmentName | User/employee department name |
| businessCategory | Grouping of products with related uses |
| ExtSubCategory | Product family |
| ExtSegment | Grouping of products with single intended use by consumer |
| ExtCostCode | User/employee cost center code |
| ExtFunction | User/employee company division |
| title | Description of the user/employee's job |
| ExtRole | User/employee "role" in business unit |
| ExtRegion | Location of user/employee, based on a Global standard |
| ExtCountry | Location of user/employee, based on country |
| st | Location of user/employee, based on divisions within country |
| ExtCity | Location of user/employee based on divisions within state |

TABLE I-continued

EXTENDED LDAP OBJECT ATTRIBUTES

| LDAP ATTRIBUTE | DEFINITION OF ATTRIBUTE |
| --- | --- |
| PostalCode | Postal code of area in which user/employee works |
| street | External mailing address |
| ExtBuilding | Company-owned building in which user/employee works |
| ExtSite | Company site |
| ExtFloor | Floor on which user/employee works |
| roomNumber | User/employee room number |
| ExtIntMailBox | Company "internal" mailing box |
| postalAddress | Full postal address used to route mail externally to user/employee |
| ExtProject | Description of user/employee's past/present project assignments |
| ExtExpertise | Description of business-related skills or areas of expertise |
| ExtLanguage | Languages spoken by user/employee |
| ExtInterest | Description of business-related skills or areas of interest |
| ExtTeam | Past and present teams that user/employee has been a member |
| ExtInitiative | Past and present initiatives that user/employee has been a member |
| ExtHomeTown | User/employee home town |
| ExtSecondary | User/employee high school |
| ExtPostSecondary | User/employee secondary school, and degree earned |
| ExtDegree | Degree earned at each level of schooling |
| ExtSignOther | Name of spouse/significant other |
| ExtChildren | Names of Children |
| ExtHobby | Activities or sports |
| ExtAffliation | Organizations user/employee is involved with outside company |
| ExtUpdateBy | Automatic or manual update flag |
| ExtUpdateTime | Time in which entry was updated |
| ExtSource | Source for entry |
| ExtPlatform | Platform/System identifiers |
| ExtShortName | Intranet short name |
| ExtGloPN | Global Personnel Number |
| employeeNumber | Local employee ID |
| ExtAltID | Alternate computing ID's |
| ExtHandle | Extranet user login name |
| ExtMailServer | Email server name |
| ExtMailDomain | Email Domain |
| ExtPrefLanguage | Preferred Language |
| ExtReqPlatform | Requested platforms |
| ExtApproverfor | Platform Approval |
| ExtNtDomain | NT Domain |
| ExtMailFile | E-mail File name |
| ExtApplication | Application object class for non-people account information. |
| ExtSession | Object class to hold login session information. |
| ExtSecurityObject | Object class to hold password security information. |
| ExtDisabled | Disabled flag |
| ExtPassword | Current password |
| ExtMaxDays | Length of time in days that passwords are valid |
| ExtPwdLastChangeDate | Date of last password change |
| ExtPwdExpirationDate | Date password expires |
| ExtPriorPwd1 | 1st previous password |
| ExtPriorPwd2 | 2nd previous password |
| ExtPriorPwd3 | 3rd previous password |
| ExtPriorPwd4 | 4th previous password |
| ExtPriorPwd5 | 5th previous password |
| ExtChallengeQuestion | Password question |
| ExtChallengeAnswer | Password question answer |
| ExtChallengePwd | Challenge password |
| extpwFailCount | Number of failed login attempts since last successful login |
| extpwFailTime | Timestamp of last failed login attempt |
| extLastLoginTime | Timestamp of last successful login attempt |

Given the LDAP object class structure shown in Table I, any number and combination of the listed attributes may be utilized in defining the membership criterion for a dynamic group, including attributes in areas such as location, user employment status, user interests, user capabilities, user education, etc. Moreover, it will be appreciated that other combinations of attributes may be added to an LDAP object depending upon the desired application and bases for selecting users into dynamic groups. It will also be appreciated that other, non-LDAP user records may be used in the alternative. Thus, the invention is not limited to the specific LDAP object implementation discussed herein.

In the exemplary security management implementation discussed hereinafter, the user and group databases are integrated into a common LDAP-based directory database. To support dynamic groups consistent with the invention, a database schema should be designed to support the concepts of users and groups. One such suitable database schema 100, suitable for use in the security management application described hereinafter, is illustrated in FIG. 7, and includes a plurality of tables 102–134. Descriptions of the fields in each of tables 102–134 are presented below in Tables II–XVIII:

Table 102 stores user information, and is formatted as shown in Table II:

TABLE II gds_t_User

| Column Name | Description |
|---|---|
| User_Id | Internal field for linking user to other database objects. |
| Login_Name | Login Name of a user. |
| Last_Name | User's last name. |
| First_Name | User's first name. |
| Initial | User's middle initial. |
| Security_Admin | Indicates whether user has Security Administrator's privileges. |
| Directory_Admin | Indicates whether user has Directory Administrator's privileges. |
| Employee | Whether user is an employee. |
| Status | Indicates whether user is active or deleted. |
| Transaction_Date | Date when the last transaction was committed by a user. |
| Transaction_Owner_Id | User_Id that committed the last transaction. |
| <additional fields> | <additional fields as described above> |

Table 104 stores information about which users are in which security groups, and is formatted as shown in Table III:

TABLE III gds_t_Group_Memberships

| Column Name | Description |
|---|---|
| User_Id | Internal field for associating user to a security group. |
| Group_Id | Internal field for associating user to a security group. |
| Sub_Group | The subgroup number of which the user is member of. |
| Status | Determines whether member needs to added to a group on the domains. |

Table 106 stores information about security groups, and is formatted as shown in Table IV:

TABLE IV gds_t_Group

| Column Name | Description |
|---|---|
| Group_Id | Internal field for linking groups to other database objects. |
| Group_Name | Name of the security group. |
| Group_Description | Description of the security group. |
| Group_Owner_Id | Security group owner. |
| Total_Sub_Groups | Total number of subgroups in which the security group is divided into. |
| Membership_Classification | Flag for classifying who can view group memberships. |
| Rule_Classification | Flag for classifying who can view group definition criteria. |
| Membership_Type | Flag to indicate whether group membership changes automatically based on attribute type, attribute value and user associated attribute changes. |
| Group_Type | Type of the group (global/local). |
| Group_Status | Used for batch processing of group and membership maintenance. |
| Membership_Status | Flag to indicate whether group membership needs to be adjusted. |
| Transaction_Date | Date when the last transaction was committed by a user. |
| Transaction_Owner_Id | User_Id that committed the last transaction. |

Table 108 stores information about which users are delegates of which security groups, and is formatted as shown in Table V:

TABLE V gds_t_Group_Delegates

| Column Name | Description |
|---|---|
| Group_Id | Group that the user is a delegate of. |
| Delegate_Id | User that is delegate of the security group. |

Table 110 stores information about which global groups are in which local groups, and is formatted as shown in Table VI:

TABLE VI gds_t_Group_Hierarchy

| Column Name | Description |
|---|---|
| Local_Group_Id | Local group that contains the global group. |
| Global_Group_Id | Global group that is in the local group. |
| Hierarchy_Status | Used for batch processing of group maintenance. |

TABLE VI-continued gds_t_Group_Hierarchy

| Column Name | Description |
|---|---|
| Transaction_Date | Date when the last transaction was committed by a user. |
| Transaction_Owner_Id | User_Id that committed the last transaction. |

Table 112 stores information about domains, and is formatted as shown in Table VII:

TABLE VII gds_t_Domain

| Column Name | Description |
|---|---|
| Domain_Id | Internal field specifying a domain. |
| Domain_Name | Domain name. |
| Domain_Type | Domain type, e.g., NT or Notes. |
| Master_Domain | Indicates whether this is the master (hub) domain. |
| Domain_Status | Used for batch processing of group and membership maintenance. |
| Transaction_Date | Date when the last transaction was committed by a user. |
| Transaction_Owner_Id | User_Id that committed the last transaction. |

Table 114 stores information about which security groups exist on which domains, and is formatted as shown in Table VIII:

TABLE VIII gds_t_Group_Domains

| Column Name | Description |
|---|---|
| Group_Id | Internal field for mapping security group to a domain. |
| Domain_Id | Internal field for mapping security group to a domain. |
| GD_Status | Used for batch processing of group maintenance. |
| Transaction_Date | Date when the last transaction was committed by a user. |
| Transaction_Owner_Id | User_Id that committed the last transaction. |

Table 116 stores information about security group definition criteria, and is formatted as shown in Table IX:

TABLE IX gds_t_Group_Definition

| Column Name | Description |
|---|---|
| Group_Id | Group to which the definition belongs to. |
| Group_Condition_No | Internal number as part of the primary key. |
| Attribute_Type_Id | Attribute type that is used in defining criterion. |
| Attribute_Condition | Comparison operator in group definition criteria. (IS/IS NOT) |
| Attribute_Value_Id | Attribute value used in group definition criterion. |
| Logic_operator | Logical operator combining various attribute types to form a group definition criterion. (AND/OR) |
| Sort_Order | Order in which attribute type criteria will be displayed on security group definition screen. |
| Transaction_Date | Date when the last transaction was committed by a user. |
| Transaction_Owner_Id | User_Id that committed the last transaction. |

Table 118 stores information about attribute types, e.g., "Organization," and is formatted as shown in Table X:

Table X gds_t_Attribute_Type

| Column Name | Description |
| --- | --- |
| Attribute_Type_Id | Internal field for associating attribute type with users, security group definitions and other database objects. |
| Attribute_Type_Name | Name of attribute type, e.g., "Organization, Function, etc." |
| Attribute_Type_desc | Description of the attribute type. |
| Attribute_Data_Type | Data type of the attribute. |
| Data_Length | Maximum permissible length of the attribute value. |
| Control_Type | Type of control that needs to be used to display attribute value, e.g., "Text Box," "Check Box," etc. |
| Default_Value | Default attribute value that will be displayed on control. |
| Attribute_Type_Owner_Id | Owner of the attribute type. |
| Attribute_Type_Status | Used for batch processing of group and membership maintenance. |
| Transaction_Date | Date when the last transaction was committed by a user. |
| Transaction_Owner_Id | User_Id that committed the last transaction. |

Table 120 stores information about which users can maintain attribute pick lists, and is formatted as shown in Table XI:

TABLE XI gds_t_Attrribute_Delegates

| Column Name | Description |
| --- | --- |
| Attribute_Type_Id | Attribute type that can be maintained by a user. |
| Delegate_Id | User that can maintain the attribute type. |

Table 122 stores information about which attribute values are associated with which user, and is formatted as shown in Table XII:

TABLE XII gds_t_User_Attributes

| Column Name | Description |
| --- | --- |
| User_Attribute_Id | Internal field to associate attribute value with user. |
| User_Id | Internal field to associate attribute value with user. |
| Attribute_Type_Id | Internal field to associate attribute value with user. |
| Attribute_Value_Id | Internal field to associate attribute value with user. |
| User_Attribute_Status | Used for batch processing of group and membership maintenance. |
| Transaction_Date | Date when the last transaction was committed by a user. |
| Transaction_Owner_Id | User_Id that committed the last transaction. |

Table 124 stores information about valid attribute values associated with attribute type, and is formatted as shown in Table XIII:

TABLE XIII gds_t_Valid_Attr_Values

| Column Name | Description |
| --- | --- |
| Valid_Attribute_Id | Internal field to associate attribute value with attribute type. |
| Attribute_Type_Id | Internal field to associate attribute type with attribute type. |
| Attribute_Value_Char | String value for the attribute. |
| Attribute_Value_Date | Date value for the attribute. |
| Attribute_Value_Number | Integer value for the attribute. |
| Vaild_Attribute_Status | Used for batch processing of group and membership maintenance. |

TABLE XIII-continued gds_t_Valid_Attr_Values

| Column Name | Description |
| --- | --- |
| Transaction_Date | Date when the last transaction was committed by a user. |
| Transaction_Owner_Id | User_Id that committed the last transaction. |

Table 126 stores audit information about which users/global group is added and deleted from which security group, and is formatted as shown in Table XIV:

TABLE XIV gds_t_Group_Memberships_Log

| Column Name | Description |
| --- | --- |
| Group_Id | Internal field for associating user to a security group. |
| Group_Name | Name of the group for which membership was changed. |
| Member_Id | User Id or Group Id for which membership was changed. |
| Member_Name | Name of the member. |
| Member_Type | Type of a member. |
| Sub_Group | The subgroup number of which the membership was altered. |
| Domain_Id | Domain id on which the membership was altered. |
| Domain_Name | Domain name on which the membership was altered. |
| Transaction_Status | Membership added/deleted |
| Transaction_Date | Date on which membership was changed. |
| Transaction_Owner_Id | Id of the user that caused the membership changes. |
| Trigger_Flag | Process that triggered membership changes, e.g.:. 0 - Member added because of new criterion added to a group definition. 1 - Member added because of attribute association with user. 2 - Member added because of global group added to a local group. 3 - Member added because of existing group being associated with new domain in directory. 4 - Member deleted because deleted group definition criterion. 5 - Member deleted because of attribute dissociated from user. 6 - Member deleted because the user was deleted from directory. 7 - Member deleted because the global group was deleted from directory. 8 - Member deleted because the attribute type was deleted from directory. 9 - Member deleted because the attribute value is deleted from directory. |

Table 128 stores auditing information about the creation and deletion of security groups on different domains, and is formatted as shown in Table XV:

TABLE XV gds_t_Group_Log

| Column Name | Description |
| --- | --- |
| Group_Id | Internal field for linking groups to other database objects. |
| Group_Name | Name of the security group |
| Domain_Id | Domain Id on which the group was created or deleted from. |
| Domain_Name | Name of the domain on which the group was created or deleted from. |
| Domain_Type | Domain type, e.g., NT or Notes. |
| Master_Domain | Indicates whether this is the master (hub) domain. |
| Group_Description | Description of the security group. |
| Group_Owner_Id | Security group owner |
| Group_Owner_Name | Owner name for the group. |
| Membership_Classification | Flag for classifying who can view group memberships. |
| Rule_Classification | Flag for classifying who can view group definition criteria. |
| Membership_Type | Flag to indicate whether group membership changes automatically based on attribute type, attribute value and user associated attribute changes. |
| Group_Type | Type of the group. |
| Group_Status | Used for batch processing of group and membership maintenance. |
| Transaction_Date | Date when the last transaction was committed by a user. |
| Transaction_Owner_Id | User_Id that committed the last transaction. |
| Success_Flag | Flag to identify whether the transaction was partial or complete success. |

TABLE XV-continued gds_t_Group_Log

| Column Name | Description |
| --- | --- |
| Trigger_Flag | Process that triggered the batch process for maintenance of the groups on domains, e..g:<br>0 - Group Added to domain because a new group was created in directory.<br>1 - Group Added to domain because an existing group in directory was associated with a domain.<br>2 - Group deleted from domain because a group was deleted from directory.<br>3 - Group deleted from domain because a group was removed from a domain in directory.<br>4 - Group was deleted from domain because the domain was deleted from directory. |

Table 130 stores information about error messages that need to be displayed by the application for different errors, and is formatted as shown in Table XVI:

TABLE XVI gds_t_Error_Code

| Column Name | Description |
| --- | --- |
| Error_Code | Error Code. |
| Error_Message | Error Message that needs to be displayed. |

Table 132 stores system parameters that are used by the application, and is formatted as shown in Table XVII:

TABLE XVII gds_t_Configuration

| Column Name | Description |
| --- | --- |
| Param_Key | Key for the parameter. |
| Param_Value | Value of the system parameter |

Table 134 stores information on reports and reporting access, and is formatted as shown in Table XVIII:

TABLE XVIII gds_t_Reports

| Column Name | Description |
| --- | --- |
| Report_Id | Internal field specifying a report. |
| Description | Report Description. |

It will be appreciated that the definition of a suitable database schema for any specific application will be highly application dependent. Therefore, the invention is not limited to the particular schema disclosed herein.

Utilization of the aforementioned dynamic group management system in a security management application 200 is illustrated in greater detail in FIG. 8. As shown in the figure, an LDAP hub directory 202, organized as discussed above in connection with FIG. 7, is populated with one or more group policies 204, representing the group configuration information described above, e.g., group membership criterion, domain selection criterion, distribution and synchronization rules, group ID, etc. Each group policy also includes security authorization information representative of the permitted and/or prohibited activities to be associated with the members of each group.

In addition, user data 206 corresponding to one or more users is entered into the LDAP directory to create one or more user records representative of users capable of being authorized via security management. As shown in block 208, one or more groups are created based upon desired group policies, and selected users are dynamically added to the new groups based upon the membership criteria associated with the various new groups (as described above in connection with FIG. 6). The result of block 208 is the addition of new groups to the LDAP directory, now represented at 210.

Next, as shown at block 212, the dynamic groups maintained in directory 210 may be pushed to one or more application-specific directories, and/or to one or more spoke directories. In the alternative, direct lookups to the hub directory 210 may simply be supported, e.g., via remote procedure calls or remote object invocations.

Also provided to the end-use directory 212 (i.e., the hub directory, a spoke directory or an application-specific directory) is a security management process 214, represented by one or more Access Control Lists (ACL's). Each ACL typically includes a resource identifier, representing the resource(s) begin protected; a privilege identifier, representing what actions are permitted on the specified resource(s); and a list of authorized entities capable of accessing the specified resource(s) with the specified permitted actions. In the case of dynamic groups, the list includes a group ID for the dynamic group(s) to be associated with the ACL. Other entities, such as individuals and enumerated groups, may also be associated with an ACL as well.

As shown in block 216, whenever an application needs to make a security check before performing a particular action, the application accesses the security management system to retrieve the ACL associated with that action. As is well known in the art of security management, the requested action will be permitted if the user is authenticated as having the appropriate rights based upon the appropriate ACL. In the case of a user that is a member of a dynamic group, therefore, the rights will be based upon a determination that the user is a member of a dynamic group having the appropriate authorization on an associated ACL. Otherwise, permission for the requested action is denied.

Figure 9:
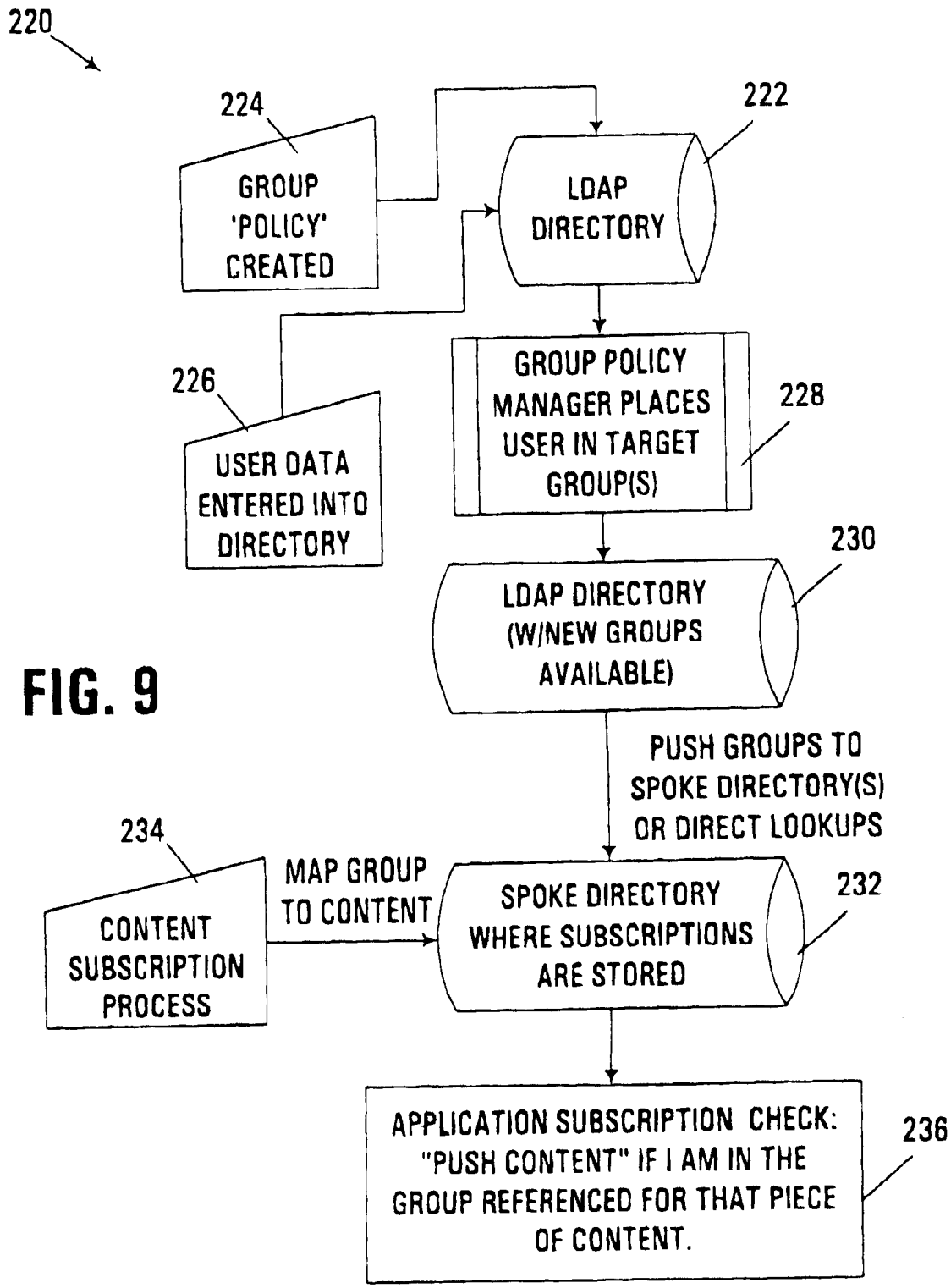
FIG. 9 is a block diagram of an exemplary content management application of the dynamic group management system of FIG. 1.

FIG. 9 next illustrates another exemplary implementation of the invention in a content management system 220, i.e., to control the distribution of content to a user based upon the user's membership within a dynamic group. As shown in the figure, an LDAP hub directory 222 is populated with one or more group policies 224, representing the group configuration information described above, e.g., group membership criterion, domain selection criterion, distribution and synchronization rules, group ID, etc.

In addition, user data 226 corresponding to one or more users is entered into the LDAP directory to create one or more user records representative of users capable of being authorized via content management. As shown in block 228, one or more groups are created based upon desired group policies, and selected users are dynamically added to the new groups based upon the membership criteria associated with the various new groups. The result of block 228 is the addition of new groups to the LDAP directory, now represented at 230.

Next, as shown at block 232, the dynamic groups maintained in directory 230 may be pushed to one or more spoke directories. In the alternative, direct lookups to the hub directory 230 may simply be supported, e.g., via remote procedure calls or remote object invocations.

Also provided to the end-use directory 232 is a content subscription process 234 that maps various content items to various dynamic groups. Each mapping may also include the specified permitted and restricted actions for the content. Thus, as shown in block 236, whenever an application needs to make a subscription check before pushing content to a particular user, the application accesses the content management system to determine whether the specified user is a member of a dynamic group mapping to the specified content. If so, the content is distributed. Otherwise, distribution is prohibited.

Figure 10:
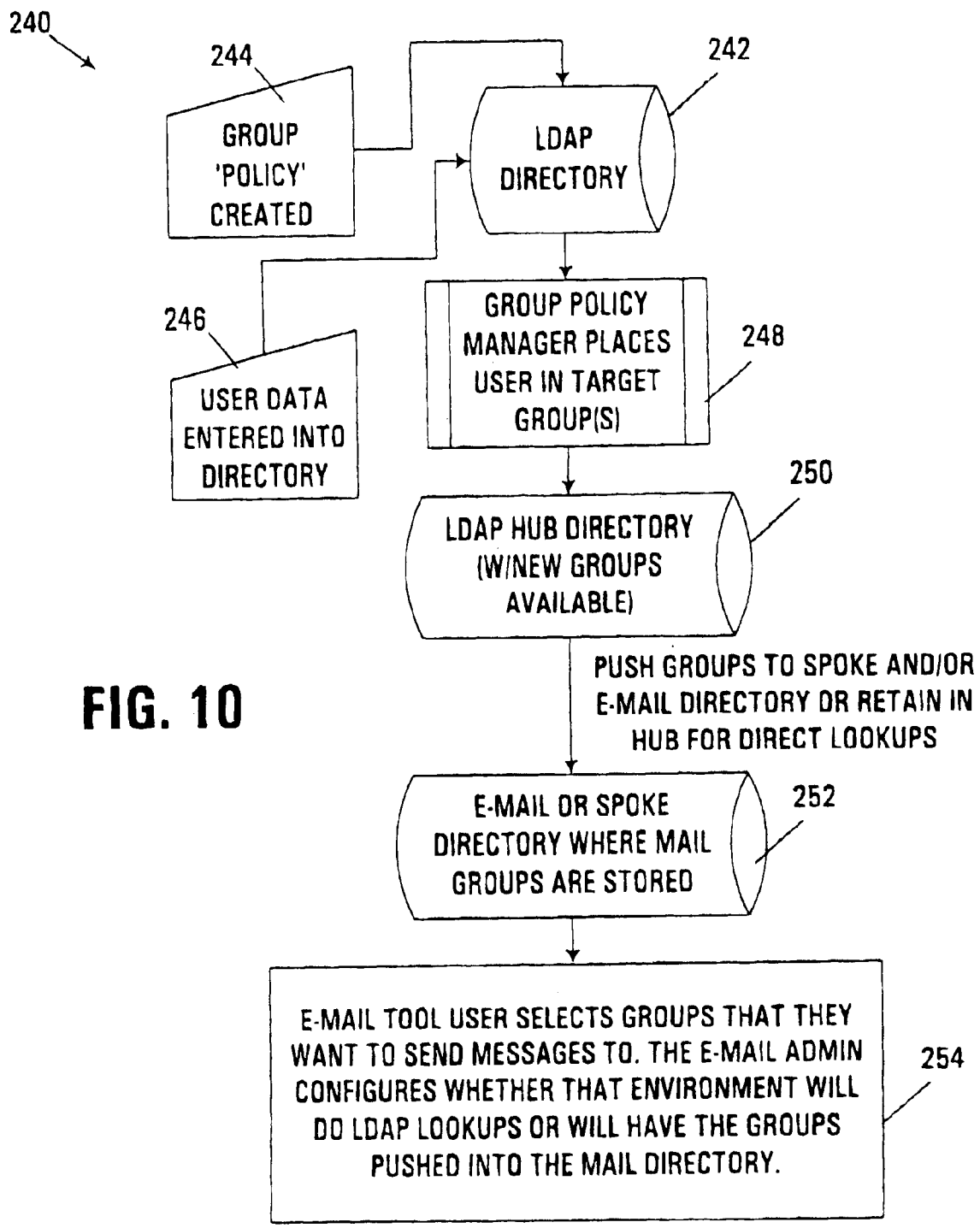
FIG. 10 is a block diagram of an exemplary electronic messaging application of the dynamic group management system of FIG. 1.

FIG. 10 next illustrates yet another exemplary implementation of the invention in an electronic messaging or groupware system 240, i.e., to address messages to multiple users based upon those users' membership within a dynamic group. As shown in the figure, an LDAP hub directory 242 is populated with one or more group policies 244, representing the group configuration information described above, e.g., group membership criterion, domain selection criterion, distribution and synchronization rules, group ID, etc.

In addition, user data 246 corresponding to one or more users is entered into the LDAP directory to create one or more user records representative of users capable of being authorized via content management. As shown in block 248, one or more groups are created based upon desired group policies, and selected users are dynamically added to the new groups based upon the membership criteria associated with the various new groups. The result of block 248 is the addition of new groups to the LDAP directory, now represented at 250.

Next, as shown at block 252, the dynamic groups maintained in directory 250 may be pushed to one or more spoke or e-mail directories. In the alternative, direct lookups to the hub directory 250 may simply be supported, e.g., via remote procedure calls or remote object invocations.

With the above-described directory structure, an e-mail tool 254 may select one or more groups and/or users from the directory for inclusion in an electronic message, in a manner generally known in the art. In addition, as shown at 254, the e-mail administrator may also configure the dynamic group management system to do direct LDAP lookups or have the dynamic groups pushed into the email directory.

Figure 11:
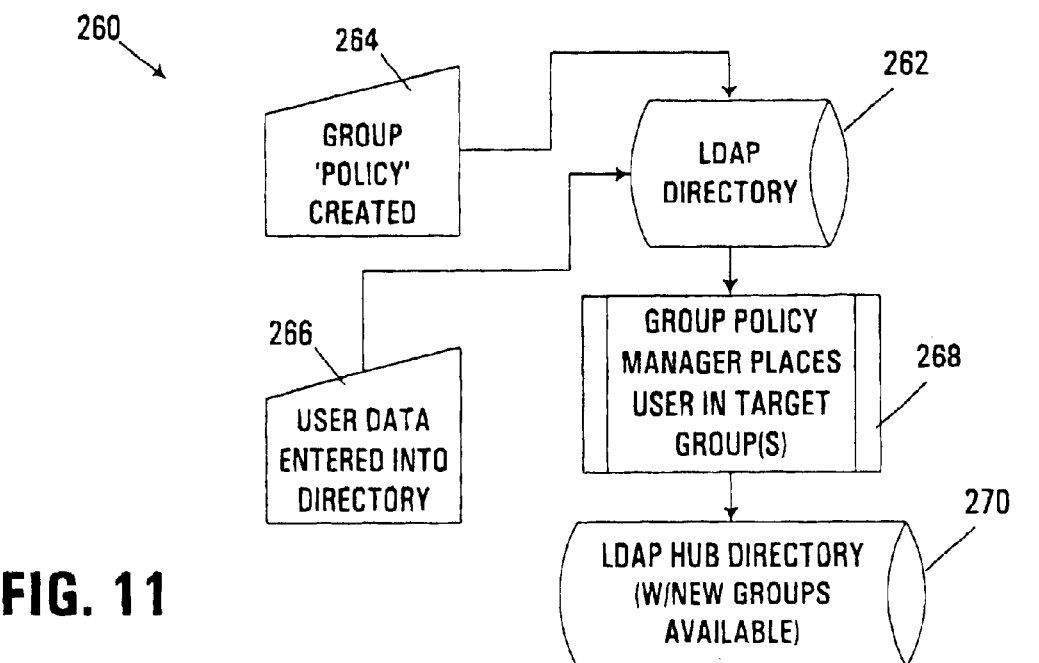
FIG. 11 is a block diagram of an exemplary software distribution application of the dynamic group management system of FIG. 1.
Figure 11:
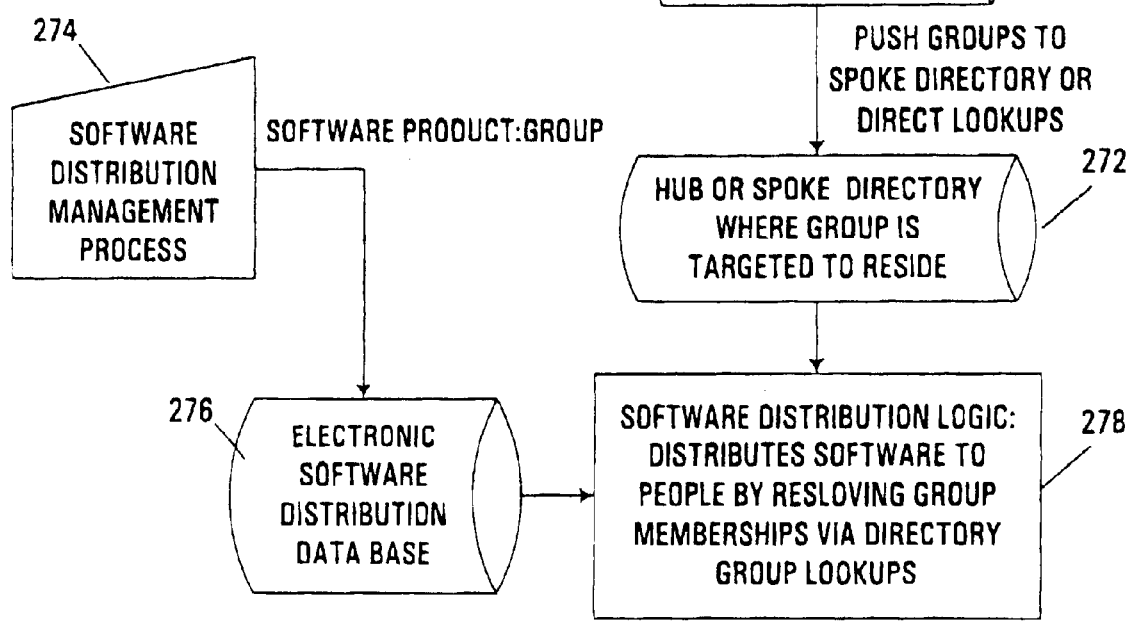

FIG. 11 next illustrates another exemplary implementation of the invention in a software distribution system 260, i.e., to control the distribution of software to a user based upon the user's membership within a dynamic group. As shown in the figure, an LDAP hub directory 262 is populated with one or more group policies 264, representing the group configuration information described above, e.g., group membership criterion, domain selection criterion, distribution and synchronization rules, group ID, etc.

In addition, user data 266 corresponding to one or more users is entered into the LDAP directory to create one or more user records representative of users capable of being authorized via content management. As shown in block 268, one or more groups are created based upon desired group policies, and selected users are dynamically added to the new groups based upon the membership criteria associated with the various new groups. The result of block 268 is the addition of new groups to the LDAP directory, now represented at 270.

Next, as shown at block 272, the dynamic groups maintained in directory 270 may be pushed to one or more spoke directories. In the alternative, direct lookups to the hub directory 270 may simply be supported, e.g., via remote procedure calls or remote object invocations.

Also provided is a software distribution management process 274 that stores mappings between software products and groups. Each mapping may also include the specified permitted and restricted actions for the software product. The mappings are provided to an electronic software distribution database 276, which is accessible by software distribution logic 278 that distributes software to individuals by resolving group memberships through directory group lookups via directory 272.

Yet another end-use application of dynamic groups is in business-to-business groups. Through the aforementioned distribution and synchronization functionality, multiple users that span multiple enterprises may participate in dynamic groups. Dynamic groups may therefore comprise extended bases of users, e.g., to link together various users such as buyers, purchasing agents, distributors, manufacturers, retailers, business partners, competitors, etc. to facilitate different business processes.

Other end-use applications of dynamic groups will be apparent to one of ordinary skill in the art having the benefit of the instant disclosure. Therefore, the invention is not limited to the particular applications disclosed herein.

WORKING EXAMPLE

One specific security management application of a dynamic group management system may be configured to have the following functionality, and may be based upon the aforementioned architecture:

1. Directory services may have capability to generate and maintain groups and group memberships based on user attributes.
2. The groups and memberships may be propagated to 'domains' (Notes servers, NT servers, or other 'Spoke' servers which must support LDAP) including development and production environments.
3. May have ability to specify creation of Global or Local group.
4. May have capability to add one or many global groups to a local group.
5. Global group may be added to a local group by using "Global Group Name" as an attribute in group definition criteria while creating/modifying a local group definition.
6. The following security classifications may apply to security groups:
    1. Group membership listings:
        1. OPEN: List group memberships for all users.
        2. CLOSED: Only group owner, delegates can list group memberships for the groups they own.
    2. Viewing group security definition:
        1. RULE-OPEN: All users can look at security group definition.
        2. RULE-CLOSED: Only group owners and delegates can view group definition for any group.

7. Two types of groups may be supported:
   1. "AUTOMATIC"—Group memberships are automatically adjusted whenever there is any change in attribute types, attribute values and/or user attributes.
   2. "ONE-TIME"—Group definition criteria will be used only to speed up generation of this group. Group definition criterion is no longer applicable to the group once the group is created. The group memberships cannot be altered from directory. (Adding and deleting specific users to and from automatically created security groups may be done via using "user name" as an attribute in the group definition criteria.)
8. Groups and membership may be created and maintained via a scheduled batch process, or near real time.
9. Groups may be left in the 'hub' where they can be read directly, or they can be pushed to 'spoke' directories, which can exist anywhere (intranets, extranets, WWW, inside other enterprises, etc.)
10. Group memberships may always be same on all domains only with the exception of a non-existent user on a particular domain.
11. May have ability to modify group creation criteria and modifying criteria should result in altering group memberships through a modification process.
12. The following synchronization functionality may be available for synchronizing groups and memberships, created from directory, across domains and directory databases:
    1. The Hub Directory may be the Master for synchronization logic.
    2. For the groups in the directory the memberships on domains (target platforms like NT, Notes or 'spoke' directories supporting LDAP) may need to be synchronized with memberships in the Hub directory database. A report may need to be generated to highlight the membership mismatches if they occur.
13. Groups that are in the directory and not on domains may need to be created on those appropriate domains.
14. Groups may get deleted in the directory only after they are deleted from all domains.
15. Security groups may not be effective dated. But attribute changes for effective dated attributes from an organization structure may automatically alter group definitions and group memberships.
16. Group Definition Criteria:
    1. Group definition criteria may be based on one or more (any number) of user attributes.
    2. Only criteria used for group definition are "value of attribute IS" and or "value of attribute IS NOT".
    3. Group definition criteria may be a combination of multiple attributes with all "AND" or all "OR" conditions.
    4. All attributes and their values for defining criteria may be selected from predefined values.
    5. Effective dated group definition criteria. Other conditions such as ">", "<", "LIKE" etc. may be used.
17. Creating Groups/Group Memberships:
    1. Only "Group Admins" may create a group.
    2. May need separate "Group Admin" privileges to create global/local groups.
    3. Partial success in creation of a group may be acceptable provided manual synchronization procedures are followed to salvage partially successful group creation scenarios. Partial success in group creation may be defined as (1) group is created at least on one domain and in the directory database for all domain; and (2) Creation of complete memberships in directory. If memberships are not successfully created on all domains, then synchronization tool may get memberships synchronized on different domains.
    4. Groups cannot be renamed.
    5. While creating group memberships, if a user does not exist on a particular domain, the user may not be a member of the group on that particular domain, but user will be a group member on the domains where he/she exists.
    6. Global groups may need to be created on all master NT and Notes domains.
    7. Global groups may be created only on NT master domains and can cause group creation on Notes domains.
    8. Local groups may be created only on NT Resource domains and can cause group creation on other domains.
    9. "Group Admins" can also specify that groups be pushed to 'spoke' directory servers.
    10. Where spoke servers exist, the InetOrgPerson Schema may be used as a mechanism for selecting users for inclusion in a group (manual or automatic). This implies that the Hub directory has read accesses to 'spoke' directories, and may be managed as a manual work process.
    11. Where spoke servers exist, the GroupofNames Object Class may be used as the target for creating groups. This implies that the Hub directory has write accesses to 'spoke' directories, which may be managed as a manual work process.
18. Modifying Groups/Group Memberships:
    1. Modifying group definition criteria may change group memberships accordingly.
    2. Delegates as well as group owners may modify group definition criteria for the groups they own.
    3. Modifying group definition criteria may generate audit log reflecting all the changes caused by changing the group definition criteria.
    4. Modifying or deleting an attribute value associated with a user may result in changing group membership during a batch transaction for that user.
    5. Changing global group definition criteria may generate a report of local groups affected by the change. This report and new rule for the global group definition may be communicated to group owners and delegates of the affected local group.
    6. Changing membership should do the changes in directory database first and then on all the domains. If memberships are not successfully changed on all domains, then synchronization tool may get memberships synchronized on different domains.
    7. Once created, global group may not be changed to local group and vice versa.
19. Deleting Groups/Group Memberships:
    1. Only group owners may delete groups they own.
    2. Groups may not be deleted from directory database until deleted from all domains.
    3. Deleting a global group may generate a report of local groups affected by the deletion. This report will may be communicated to group owners and delegates of the affected local groups.
    4. Deleting memberships may delete memberships in directory first and then on the domains. Synchronization may be done in case of partial success in deleting memberships.

20. Attribute Types and Attribute Values:
   1. "Attribute type owner" may own attribute types and the pick list values associated with the attribute types he/she owns.
   2. "Attribute type owner" may modify or delete attribute types and pick list values that he/she owns.
   3. HR may assign or remove HR-related attribute values associated with users.
   4. Attribute types and attribute values may be deleted even if they are assigned to a user. Group membership may be adjustable accordingly for the user via a batch process.
   5. Attribute types or attribute values may be deleted even if they are used in the group definition criteria. The group definition and group memberships for the groups using the deleted attribute type/value may then be altered. The group may not be deleted even if there does not exist any members in the group. Notification may need to be sent to owners and delegates of altered groups.
   6. From an HR perspective, security groups may be created for following criteria:
      1. Users working for one or more organizations.
      2. Scope (Global/Regional)
      3. Business Unit
      4. Function
      5. Region
      6. Role/Level
      7. Home organization of positions
      8. All users reporting directly to a position.
      9. All users reporting directly and indirectly to a position.
      10. Country
      11. Office internal address
      12. Employment Status
      13. Employee/Contractor/EBP (external business partner)
      14. Sitecode 21. Group Ownership/Delegates:
   1. There may always be one owner for every group.
   2. Ability to transfer ownership of a group.
   3. Only group owner and "Directory Admin" may transfer ownership of group.
   4. Ability to delegate group membership maintenance to other users or groups.
   5. Only group owner may add or remove delegates for the groups they own.
   6. Transferring group ownership may retain the delegates on the group.
   7. Delegates may not manage other delegates.

22. Reporting (i.e., what information can be retrieved):
   1. List of groups a user belongs to.
   2. List of users in a group.
   3. List of groups owned by an owner.
   4. List of all users and roles for all administrative users.
   5. List of delegates for a group.
   6. List of all groups with their owners and delegates.

Synchronization and Dynamic Updates

The aforementioned exemplary security management application may include a Group Management Service (GMS) program and a Group Synchronizer Service (GSSYNC) program that cooperatively are used to dynamically update dynamic groups consistent with the invention. The GMS program may be responsible for maintenance of groups, and may generally operate by reading command-requests in a Global Directory Services (GDS) database functioning as a hub directory, and acting upon the commands, making group changes against the hub directory. Such changes may then be pushed out, selectively, to specific domains (e.g. Windows NT, Lotus Domino, ORACLE, or other LDAP directories functioning as spoke directories.

Commands to the GMS program may be made by users via a thin-client (user-interface) component of the GDS system. Command-requests may be read, in turn, by GMS and transformed or deleted to acknowledge acceptance of the commands. The GMS may modify the groups and group membership on platforms (e.g., Notes and NT domains) as well as spoke directory servers, and record their states in the GDS database. For example, the status attributes discussed above in connection with FIG. 7 may be used to identify records to be operated upon by the GMS program, e.g., with a status of 0 when active and processed, and a status <>0 when some processing is required.

The GMS program may be scheduled or near real-time, and may be implemented as a multi-threaded service that processes group changes and group memberships based on configurable parameters.

The GSSYNC program may be configured as a process that operates in conjunction with the GMS program, but at a lower priority, running only run when the GMS program is not running. If the GSSYNC program is running when the GMS program begins execution, it may request that the GSSYNC program suspend or terminate itself to prevent potential group and membership conflicts between the two processes.

A principal responsibility of the GSSYNC program may be to ensure that groups and their memberships are consistent with respect to the GDS database and the attendant domains. The GSSYNC program may be a configurable, multi-threaded service that processes an unlimited number of group and group membership changes per hour, by scaling that service through replication.

GMS Program Functional Flow

The following represents a conceptual view of the GMS logic. At the highest level, the GMS logic typically executes sequentially. However, for certain operations, the GMS program may spawn and synchronize multiple threads of execution to hasten adjustment of group membership lists. Additional worker threads may also be spawned to adjust group membership.

The GMS program may be configured to execute the following steps each time it is scheduled to run:

1. Protect Against Synchronizer Conflict

In general terms, the GMS program typically runs more frequently than the GSSYNC program, e.g,. once per hour vs. once per week. To prevent conflict, the GMS and GSSYNC programs are typically mutually exclusive, with the GMS program having higher priority. Thus, if the GMS program wishes to run but finds that the GSSYNC program is running, it should issue a request for the GSSYNC program to either suspend or shut down, and then retry the operation. In addition, this logic prevents multiple instances of the GMS program from executing simultaneously.

```
[START]
if GMS already running
    exit
endif
```

```
if GSSYNC running
    send GSSYNC request to suspend or shutdown
    goto START
else
    set GSSYNC lock to prevent GSSYNC from running
endif
```

2. Delete Groups

This section honors command requests for group deletion:

```
for each group to be deleted:
    del grp definition
    del grp members
    del grp delegates
    if local grp
        del grp hierarchy (global grps that may belong)
    endif
    for domains in which grp exists
        if grp global
            for any local grps possessing global grp
                del global group membership on domain
        endif
        del grp from domain
        del grp mapping for domain
        log delete/result code
    next
    if no errors
        del grp
        del grp hierarchy
    endif
next
```

3. Remove Group from Domain

This section honors command requests to remove a group from a domain, where a domain is a target platform (e.g. NT or Notes Domino, or a spoke directory based on LDAP or other technologies). This task applies to both global and local groups.

```
for each group to be removed
    del grp from domain
    del grp map for domain
    log result code
next
```

4. Delete Domains

This section honors command requests to remove a domain from the system altogether.

```
for each domain to be removed
    get list of grps mapped to that domain
    for each grp
        if grp global
            for any local grps possessing global grp
                del global group membership
            next
        endif
        del grp from domain
        del grp mapping for domain
        log delete/result code
    next
next
```

5. Delete Attribute Types

This section honors command requests to delete attribute types; note that removing an attribute type can result in changed group memberships, based upon group definition criteria.

```
for each attribute type to be deleted
    for each group that uses this attribute type
        del group defn attributes that match attribute_type_id
    next
    delete user attributes that match attribute_type_id
    delete attribute values that match attribute_type_id
    delete attribute delegates
    delete attribute types themselves
next
```

6. Delete Attribute Values

This section honors command requests to delete attribute values; note that removing an attribute value can result in changed group memberships, based upon group definition criteria.

```
for each attribute value to be deleted
    for each group that uses this attribute value in its defn
        del group defn attr that match attribute_value_id
    next
    del user attributes that match attribute_type_id
    reset default value for attribute_type_id
    del attribute values that match attribute_type_id
next
```

7. Delete User Attributes

This section honors command requests to delete user attributes; note that removing a user attribute can result in changed group memberships, based upon group definition criteria.

```
for each user attribute to be deleted
    for each group that references this attribute_type with
            this attribute value
        determine whether user is added or dropped from the group
    next
    delete gds_t_user_attributes for this user attribute
next
```

8. Calculating Deltas for Memberships

The membership generation process is initiated by a set of 'deltas' (or changes to the desired group membership). Members to be removed are signified by a group membership status value of 2; members to be added are denoted by a group membership status of 1.

```
for each group
    get list of current members
    get list of new members based upon group defn criteria
    discrepency-check:
    generate list of members to remove
    generate list of members to add
next
```

9. Add a Group to a Domain

This section honors requests to add a group to a domain. This task applies to both global and local groups.

```
for each group to be added
    create group on domain
    update group status
    get a membership list for this group
    populate membership in the domain
    if group is local
        get list of global groups contained in this group
        add global groups to domain
    endif
next
```

10. Delete Global Groups from Local Groups

Global groups may be permitted to be members of local groups (the converse is typically not true, however); it may be desirable to remove global groups from local groups, as follows.

```
For each global group to be deleted from a local group
    For the local group for this record
        For each domain
            Remove global group from domain
        Next
        Delete gds_t_group_hierarchy record
    Next
Next
```

11. Add Global Groups to Local Groups

Addition of global groups to local groups occurs as follows.

```
For each global group to be added to a local group
    For the local group for this record
        For each domain
            Add global groups from domain
        Next
        Update gds_t_group_hierarchy record.status
    Next
Next
```

12. Adjust Membership on Domains or Spoke Servers

This section honors the group membership 'deltas' (or change requests) as represented in the membership table. Firstly, necessary group memberships are deleted. Secondly, requested group membership additions are made. Multiple, separate threads can execute the addition and deletion requests; however, each thread typically must deal with an independent group.

```
For each group member to be deleted
    For the group, get list of domains
    For each domain
        Delete member from group
    Next
    Delete this group membership record
Next
For each group member to be added
    For the group, get list of domains
    For each domain
        Add member to group
    next
Next
```

14. Release Synchronizer Lock

After executing the aforementioned sequence of operations, the GMS program may release its 'lock' for GSSYNC program. In the remaining inactive time (between scheduled runs of the GMS program), the GSSYNC program is permitted to execute, honoring only active groups and memberships (status value set to 0).

GSSYNC Program Functional Flow

The following represents a generalized view of the GSSYNC logic. At the highest level, the GSSYNC logic may execute sequentially. However, for certain operations, GSSYNC program may be configured to spawn and synchronize multiple threads of execution to hasten adjustment of group membership lists. As needed, worker threads can be spawned to adjust group membership.

The GSSYNC process may be configured to execute the following steps each time it is scheduled to run:

1. Protect Against Synchronizer Conflict

As above with the GMS program, the GSSYNC program is required to verify the GMS program is not currently running.

```
[START]
if GSSYNC already running
    exit
endif
if GMS running
    exit
endif
```

2. Validate Global Groups

This section determines whether all GDS global groups actually exist on all master domains. If they are not all present, GSSYNC program will create the groups on the appropriate domains.

```
fetch list of global groups from GDS
for each global group
    for each master domain
        if global group not present on domain
            create global group on domain
            record in GDS
        endif
    next
next
```

3. Validate Local Groups

This section determines whether all GDS local groups actually exist on the specified domains. If they are not all present, the GSSYNC program may create the local groups on the appropriate domains.

```
fetch list of local groups from GDS
for each local group
    for each domain registered for the local group
        if local group not present on domain
            create local group on domain
            record in GDS
        endif
    next
next
```

4. Validate Global Group Membership

This section synchronizes the membership of global groups based upon the membership lists maintained by the GDS.

```
For each global group
    get a list of members for the group from GDS (status = 0)
    for each master domain
        get members of group on domain
    next
    discrepancy-check and build list of adds/drops
    for all drop records
        drop on specified domain
    next
    for all add records
        add on specified domain
    next
next
```

5. Validate Local Group Membership

This section synchronizes the membership of local groups based upon the membership lists maintained by the GDS.

```
For each local group
    get a list of members for the group from GDS (status = 0)
    get a list of global groups for the group from GDS (status = 0)
    for each domain
        get members of group on domain
        get global groups on domain
    next
    discrepancy check, build list of adds/drops
    for all drop records
        drop on specified domain
    next
    for all add records
        add on specified domain
        next
next
```

6. Release Synchronizer Lock

After executing the sequence of operations, the GSSYNC program will release its 'lock' for GMS.

7. Background Tasks

Because it is of a lower priority, the GSSYNC program may execute a background thread that polls the GMS program synchronizer lock. If the GMS program synchronizer lock is set (indicating that the GMS program is requesting that GSSYNC program terminate), the GSSYNC program may terminate itself after safely finishing its current operation.

The GMS and GSSYNC modules may not be configured to talk to the domains or directory services database directly. Instead, they may share domain and GDS database services which reside in a separate API. The following API functions may be provided for shared use by the GMS and GSSYNC modules:

General Services

Initialize—initializes communications with GDS and domains

Log_error—logs an error message

Log_group change—logs a group change to the GDS group log table

Log_member_change—logs a member change to the GDS member log table

Terminate—terminates communication with GDS and domains

High-Level Services

Group_ins—creates a group from any domain, records in GDS

Group_del—deletes a group from any domain, records in GDS

Member_ins—adds a member to a group, records in GDS

Member_del—deletes a member from a group, records in GDS

Group_list—lists groups present on any domain

Member_list—lists members present on any domain

GDS Access Services

Ins—adds a new record to one of the GDS tables

Upd—updates one or more records in GDS tables

Del—deletes one or more records from the GDS tables

SQL—retrieves information based upon a SQL query from GDS

Notes Primitive Services (for Lotus Notes domains)

NO_group_ins—adds a group to a Notes domain

NO_group_del—deletes a group from a Notes domain

NO_group_list—retrieves list of groups from Notes domain

NO_member_ins—adds a member to a Notes domain

NO_member_del—deletes a member from a Notes domain

NO_member_list—retrieves list of group members from Notes domain

NT Primitive Services (for Windows NT domains)

NT_group_ins—adds a group to an NT domain

NT_group_del—deletes a group from an NT domain

NT_group_list—retrieves list of groups from NT domain

NT_member_ins—adds a member to an NT domain

NT_member_del—deletes a member from an NT domain

NT_member_list—retrieves list of group members from NT domain

Spoke Primitive Services

SPT_group_ins—adds a group to a spoke directory

SPT_group_del—deletes a group from a spoke directory

SPT_group_list—retrieves list of groups a spoke directory

SPT_member_ins—adds a member to a spoke directory

SPT_member_del—deletes a member from a spoke directory

SPT_member_list—retrieves list of group members from a spoke directory

Arguments for the API functions typically vary based upon domain and required functionality (e.g., NT group functions will take a BOOL flag indicating global/local group status). In addition, Notes functions will typically automatically compensate for canonical naming issues (e.g., adding a member via NO_member_ins will automatically add a short and a long—canonical—name to the membership list).

Various modifications may be made to the illustrated embodiments without departing from the spirit and scope of the invention. Therefore, the invention lies in the claims hereinafter appended.

What is claimed is:

1. An apparatus comprising:

(a) a database within which is resident a dynamic group data structure, the dynamic group data structure including a group membership criterion and a set of member identifiers, each member identifier identifying a user from a plurality of users that meets the group membership criterion; and (b) a program, coupled to the database, the program configured to dynamically update the dynamic group data structure by updating the set of member identifiers to include those of the plurality of users that currently meet the group membership criterion as of the dynamic update;

wherein the program is configured to initially generate the dynamic group data structure by associating the group membership criterion with the dynamic group data structure, and by determining those of the plurality of users that meet the group membership criterion to initially associate the set of member identifiers with the group data structures:

wherein the program is further configured to generate the dynamic group data structure without user enumerations of any users to be associated with the dynamic group data structure.

2. The apparatus of claim 1, wherein each user is associated with at least one characteristic, and wherein the group membership criterion selects users having a common characteristic.

3. The apparatus of claim 2, wherein each of the plurality of users is associated with a user record, each user record including at least one attribute value for an attribute so as to represent a characteristic associated with the user associated with such user record, wherein each member identifier identifies the user record associated with its identified user, and wherein the group membership criterion identifies at least one attribute used to determine whether a user meets the group membership criterion.

4. The apparatus of claim 2, wherein the at least one characteristic associated with each user is selected from the group consisting of user skill, user job assignment, user specialty, user task, user role, user physical location, user organizational location, user network location, user domain, user interest, organization, company, work group, skills, roles, and combinations thereof.

5. The apparatus of claim 1, further comprising a security program configured to access the dynamic group data structure during authorization of a selected user from the plurality of users.

6. The apparatus of claim 5, wherein the security program is configured to grant access to a resource when the selected user is authorized.

7. The apparatus of claim 6, wherein the resource includes an electronically distributed computer program.

8. The apparatus of claim 6, wherein the resource includes electronically distributed artistic content.

9. The apparatus of claim 6, wherein the resource includes a network resource.

10. The apparatus of claim 1, further comprising a second program configured to access the dynamic group data structure when obtaining an electronic messaging address for a selected user from the plurality of users.

11. The apparatus of claim 1, wherein each of the plurality of users is associated with a user record maintained a user database among a plurality of distributed user databases.

12. The apparatus of claim 11, wherein the plurality of distributed user databases are under the control of the same business enterprise.

13. The apparatus of claim 11, wherein at least a portion of the plurality of distributed user databases are under the control of different business enterprises.

14. The apparatus of claim 11, wherein the program is configured to dynamically update the dynamic group data structure by initiating a query on each of the plurality of distributed user databases to retrieve member identifiers associated with users from each of the distributed user databases that match the group membership criterion.

15. The apparatus of claim 11, further comprising a first computer configured to store the database, wherein the program is further configured to generate a mirrored group data structure including at least a subset of member identifiers from the set of member identifiers associated with the dynamic group data structure, and to distribute the mirrored group data structure to a second database in a second computer interfaced with the first computer.

16. The apparatus of claim 15, wherein the mirrored group data structure includes the entire set of member identifiers.

17. The apparatus of claim 15, wherein the mirrored group data structure includes only those member identifiers from the set of member identifiers that are associated with the same business enterprise as that associated with the second computer.

18. The apparatus of claim 15, wherein the program is further configured to synchronize the mirrored group data structure with the dynamic group data structure.

19. The apparatus of claim 18, wherein the program is configured to synchronize the mirrored group data structure with the dynamic group data structure in response to an update to at least one of the dynamic group data structure and the mirrored group data structure.

20. The apparatus of claim 15, wherein the first and second databases share a common database platform.

21. The apparatus of claim 15, wherein the first and second databases are based on separate database platforms, and wherein the program is further configured to convert the mirrored group data structure to a format suitable for the database platform for the second database prior to distributing the mirrored group data structure to the second database.

22. The apparatus of claim 15, wherein the program is further configured to generate a second mirrored group data structure including at least a second subset of member identifiers from the set of member identifiers associated with the dynamic group data structure, and to distribute the second mirrored group data structure to a third database in a third computer interfaced with the first computer.

23. The apparatus of claim 22, wherein the second and third databases are based on separate database platforms.

24. The apparatus of claim 1, wherein the dynamic group data structure further has associated therewith a security policy that controls access to the dynamic group data structure.

25. The apparatus of claim 24, wherein the security policy for the dynamic group data structure includes security rights associated with individual member identifiers from the set of member identifiers.

26. The apparatus of claim 1, wherein the program is configured to dynamically update the dynamic group data structure in response to a modification to the group membership criterion.

27. A computer-implemented method of managing a group of members, the method comprising;
   (a) accessing a dynamic group data structure in a database, the dynamic group data structure including a group membership criterion and a set of member identifiers, each member identifier identifying a user from a plurality of users that meets the group membership criterion; and
   (b) dynamically updating the dynamic group data structure by updating the set of member identifiers to include those of the plurality of users that currently meet the group membership criterion as of the dynamic update;
   wherein the method is configured to initially generate the dynamic group data structure by associating the group membership criterion with the dynamic group data structure, and by determining those of the plurality of users that meet the group membership criterion to initially associate the set of member identifiers with the group data structures;
   wherein the method is further configured to generate the dynamic group data structure without user enumerations of any users to be associated with the dynamic group data structure.

28. A computer implemented method of creating a group of member users among a plurality of users, the method comprising:
   (a) associating with a dynamic group data structure a group membership criterion;
   (b) determining those of the plurality of users that meets the group membership criterion; (and) (c) associating with the dynamic group data structure a set of member identifiers that identify those users that meet the group membership criterion; and (d) dynamically updating the dynamic group data structure by updating the set of member identifiers to include those of the plurality of users that currently meet the group membership criterion as of the dynamic update:

wherein the method is configured to initially generate the dynamic group data structure by associating the group membership criterion with the dynamic group data structure, and by determining those of the plurality of users that meet the group membership criterion to initially associate the set of member identifiers with the group data structures;

wherein the method is further configured to generate the dynamic group data structure without user enumerations of any users to be associated with the dynamic group data structure.

29. A program product, comprising:

(a) a program configured to dynamically update the dynamic group data structure, which includes a group membership criterion and a set of member identifiers, each of which identifying a user from a plurality of users that meets the group membership criterion, the program configured to dynamically update the dynamic group data structure by updating the set of member identifiers to include those of the plurality of users that currently meet the group membership criterion as of the dynamic update;

wherein the program is configured to initially generate the dynamic group data structure by associating the group membership criterion with the dynamic group data structure, and by determining those of the plurality of users that meet the group membership criterion to initially associate the set of member identifiers with the group data structures;

wherein the program is further configured to generate the dynamic group data structure without user enumerations of any users to be associated with the dynamic group data structure; and (b) a signal bearing medium bearing the program.

30. A data processing system, comprising:

(a) a hub computer;

(b) a plurality of target computer environments networked to the hub computer;

(c) a database resident on the hub computer, the database including a dynamic group data structure, the dynamic group data structure including a group membership criterion and a set of member identifiers, each member identifier identifying a user from a plurality of users that meets the group membership criterion; and (d) a program, coupled to the database, the program configured to generate a mirrored group data structure including at least a subset of member identifiers from the set of member identifiers associated with the dynamic group data structure, and to distribute the mirrored group data structure to a target computer environment from the plurality of target computer environments;

wherein the program is configured to initially generate the dynamic group data structure by associating the group membership criterion with the dynamic group data structure, and by determining those of the plurality of users that meet the group membership criterion to initially associate the set of member identifiers with the group data structures;

wherein the program is further configured to generate the dynamic group data structure without user enumerations of any users to be associated with the dynamic group data structure.

31. The data processing system of claim 30, wherein the program is further configured to dynamically update the dynamic group data structure by updating the set of member identifiers to include those of the plurality of users that currently meet the group membership criterion as of the dynamic update.

32. The data processing system of claim 30, wherein each of the plurality of users is associated with a user record maintained a user database among a plurality of distributed user databases, each user database resident in a target computer environment from the plurality of target computer environments.

33. The data processing system of claim 32, wherein the plurality of target computer environments are under the control of the same business enterprise.

34. The data processing system of claim 32, wherein at least a portion of the target computer environments are under the control of different business enterprises.

35. The data processing system of claim 32, wherein the program is configured to dynamically update the dynamic group data structure by initiating a query on each of the plurality of distributed user databases to retrieve member identifiers associated with users from each of the distributed user databases that match the group membership criterion.

* * * * *